(12) United States Patent
Freedman

(10) Patent No.: US 7,309,983 B2
(45) Date of Patent: *Dec. 18, 2007

(54) METHOD FOR DETERMINING CHARACTERISTICS OF EARTH FORMATIONS

(75) Inventor: Robert Freedman, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 146 days.

This patent is subject to a terminal disclaimer.

(21) Appl. No.: 11/244,266

(22) Filed: Oct. 5, 2005

(65) Prior Publication Data

US 2006/0055403 A1 Mar. 16, 2006

Related U.S. Application Data

(60) Provisional application No. 60/679,342, filed on May 10, 2005.

(51) Int. Cl.
*G01V 3/00* (2006.01)
(52) U.S. Cl. .......................... 324/303; 702/6
(58) Field of Classification Search ................ 324/303, 324/300; 702/6, 13
See application file for complete search history.

(56) References Cited

U.S. PATENT DOCUMENTS 5,444,619 A 8/1995 Hoskins et al.
6,111,408 A 8/2000 Blades et al.
6,859,032 B2 2/2005 Heaton et al.
7,091,719 B2 * 8/2006 Freedman .................... 324/303
2004/0253743 A1 12/2004 Freed
2006/0132128 A1 6/2006 Freedman et al.

FOREIGN PATENT DOCUMENTS

GB 2413636 2/2005

OTHER PUBLICATIONS

Freedman et al., "A New NMR Method of Fluid Characterization in Reservoir Rocks: Experimental Confirmation and Simulation Results," SPE 75325, SPE Journal, Dec. 2001, pp. 452-464.
Morriss et al., "Hydrocarbon Saturation and Viscosity Estimation from NMR Logging in the Belridge Diatomite," SPWLA 35th Annual Logging Symposium, Jun. 19-22, 1994.
Barber, "Real-Time Environmental Corrections for the DIT-E Phasor* Dual Induction Tool," SPWLA 26th Annual Logging Symposium, Jun. 17-20, 1985.

(Continued)

*Primary Examiner*—Louis M. Arana
(74) *Attorney, Agent, or Firm*—Bryan L. White; Kevin P. McEnaney; Dale V. Gaudier

(57) ABSTRACT

A method for determining a characteristic of earth formations from measurements taken on the formations, includes the following steps: producing a data base that includes a multiplicity of data points, each data point representing a stored formation characteristic output related to a stored input measurement; deriving, from the data base, a mapping function; deriving an input formation measurement value; and determining an output formation characteristic value from the data base, the mapping function, and the input formation measurement value.

28 Claims, 14 Drawing Sheets

OTHER PUBLICATIONS

Fujisawa et al., "Analyzing Reservoir Fluid Composition in-situ in Real Time: Case Study in a Carbonate Reservoir," SPE 84092, Oct. 5-8, 2003.

Rosthal et al., "Field Test Results of an Experimental Fully-Triaxial Induction Tool," SPWLA 44th Annual Logging Symposium, Jun. 22-25, 2003.

Kienitz et al., "Accurate Logging in Large Boreholes," SPWLA 27th Annual Logging Symposium, Jun. 9-13, 1986.

Lo et al., "Mixing Rules and Correlations of NMR Relaxation Time with Viscosity, Diffusivity, and Gas/Oil Ratio of Methane/Hydrocarbon Mixtures," SPE 77264, SPE Journal, Mar. 2002.

Skoog et al, Fundamentals of Analytical Chemistry, 3rd Ed., Ch. 22 An Introduction to Absorption Spectroscopy, Quantitative Aspects of Absorption Measurement, pp. 505-511, 1976.

Winkler et al., "The Limits of Fluid Property Correlations used in NMR Well Logging, an Experimental Study of Reservoir Fluids at Reservoir Conditions," SPWLA 45th Annual Logging Symposium, Jun. 6-9, 2004.

Powell, "Radial Basis Function Methods for Interpolation to Functions of Many Variables," DAMTP 2001/NA11, 5th Hellenic-European Conference on Computer Mathematics and its Applications, Athens, Sep. 2001.

Weyer, Near-Infrared Spectroscopy of Organic Substances, Applied Spectroscopy Review, 21 (1&2), 1-43, 1985.

Haykin, Neural Networks A Comprehensive Foundation, 2nd Ed., Ch. 5 Radial-Basis Function Networks, pp. 256-317, Prentice Hall, 1999.

Micchelli, "Interpolation of Scattered Data: Distance Matrics and Conditionally Positive Definite Functions," Constructive Appoximation 2: 11-22, Springer-Verlag, NY 1986.

Siesler, et al., "Near-Infrared Spectroscopy, Principles, Instruments, Applications," Wiley-VCH 2002.

Tarantola, "Inverse Problem Theory: Methods for Data Fitting and Model Parameter Estimation," Elsevier Science Publishers B.V. , 1987.

\* cited by examiner

METHOD FOR DETERMINING CHARACTERISTICS OF EARTH FORMATIONS

RELATED APPLICATIONS

The present application claims priority from U.S. Provisional Patent Application Ser. No. 60/679,342, filed May 10, 2005.

FIELD OF THE INVENTION

This invention relates to techniques for determining characteristics of earth formations and, more particularly, to techniques that operate to determine such characteristics from measurements in said formations, while avoiding the need for employing complex and difficult inversion approaches which, if available at all, have heretofore been conventionally used with limited success in various applications.

BACKGROUND OF THE INVENTION

The interpretation of well logging and geophysical measurements generally involves formulating and solving a mathematical inverse problem. That is, typically, one would like to predict the physical properties of some underlying physical system from a suite of measurements. For example, the measurements could be from a borehole logging tool or a suite of tools for which the underlying physical system is the porous fluid-filled rock formations surrounding the borehole. In this case, the physical properties predicted from the measurements might include porosities, permeabilities, fluid types and saturations, and bed thicknesses. For geophysical exploration, the measurements could be surface measurements of reflected seismic wave energy as a function of wavelength made at different receiver locations. In this case, the underlying physical system is the subsurface consisting of layers of porous sediments. The physical properties of interest are the hydrocarbon-bearing layers, if any, and their subsurface depths.

The traditional approach used to solve inverse problems is to fit a theoretical or empirically derived forward model to the measurement data (see e.g. the book by A. Tarantola, "Inverse Problem Theory: Methods For Data Fitting And Model Parameter Estimation", published by Elsevier, Amsterdam, The Netherlands, 1987). The forward model is a function of a set of model parameters that are either identical to or related to the physical properties of the underlying physical system. Selecting the values of the model parameters that minimize the difference between the actual measurements and those predicted by the forward model is assumed to solve the inverse problem. This basic assumption is itself fraught with difficulties and can lead to erroneous solutions because most well logging and geophysical inverse problems are ill posed, i.e., the solutions are not unique.

The traditional approach has other inherent limitations and caveats that render it unsuitable for providing accurate solutions to many problems of interest. For example, petrophysical systems are typically so complex that accurate forward models are not available. A well-known example is the Archie equation used to predict water saturations from electrical conductivity or resistivity measurements made on porous rocks. The Archie equation contains exponents and parameters that have been observed to have a wide range of values for reservoir rocks. The wide range of possible parameters and exponents is due to the complexity of porous rocks and can result in water saturation predictions with large uncertainties.

There are other well-logging problems for which reasonably accurate forward models can be derived from the laws of physics but fitting the forward model to the measurements is often computationally too expensive for real time applications. This includes, for example, forward models for the responses of logging tools (electromagnetic, sonic, nuclear) disposed in boreholes that penetrate model earth formations of various descriptions including formations that have dipping beds with different thicknesses and physical properties. Iterative fitting of the data to the forward model is computationally too expensive for many real time well-logging applications.

The above-referenced copending U.S. patent application Ser. No. 10/836,788 relates, inter alia, to methods for determining properties of formation fluids. As described in the Background portion of that Application, downhole formation fluid sampling tools, sometimes called formation-testing tools, operate to draw, and sometimes test, fluid samples from formations. Useful measurements can be made on these fluid samples while the tool is downhole, and/or upon samples that are retained and brought uphole.

When a fluid sample is taken in a hydrocarbon-bearing zone, it can be very useful to determine properties of the hydrocarbon sample, for example viscosity and/or molecular composition. However, existing techniques are limited in their ability to determine these properties. For example, viscosity can be predicted from the damping of a vibrating mechanical instrument, but such measurements downhole require that the device operate in a difficult environment that is not conducive to reliable and accurate operation of the device. A nuclear magnetic resonance (NMR) tool can be employed in a formation-testing tool (see, for example, U.S. Pat. No. 6,111,408), and NMR measurements on formation fluids can provide information from which properties of the fluids can be inferred. Because petroleum fluids are complex mixtures containing many different kinds of hydrocarbon molecules, the accurate prediction of viscosity and composition for arbitrary temperature (T) and pressure (P) is difficult. One approach is to use physics models or correlations that relate the physical property being predicted to NMR measurements using an equation containing empirically determined parameters.

An example of a technique for the prediction of viscosity of formation fluids from NMR measurements of relaxation time ($T_1$ and $T_2$) and diffusion coefficient (D) distributions is based on empirical correlations (see Morriss et al., SPWLA Annual Transactions, Paper C, Tulsa, Jun. 19-22, 1994; R. Freedman et al., "A new NMR method of fluid characterization in reservoir rocks: Experimental confirmation and simulation results," *SPE Journal*, v. 6, No. 4, 452-464, 2001; S. Lo et al., "Mixing rules and correlations of NMR relaxation time with viscosity, diffusivity, and gas/oil ratio," SPE Journal, v. 7, No. 1, 24-34, March 2002). The correlations relate the logarithmic means of the distributions to viscosity using empirically determined constants. The accuracy of the viscosities predicted from these correlations is limited by three factors: (1) the detailed shape of the distributions is not accounted for (2) the empirical constants used in the correlations are not universal and can vary by as much as a factor of two for different oils and (3) the assumed form for the correlation equations is not strictly accurate.

Molecular composition can be very coarsely estimated in downhole fluid sampling tools using optical density measurements as a function of wavelength for radiation in the near infrared region (G. Fujisawa et al., "Analyzing reservoir fluid composition in situ in real time: Case study in a carbonate reservoir," SPE Paper 84092, in the Transactions of the Society of Petroleum Engineers Annual Technical Conference and Exhibition, 2003). The technique uses principal component regression analysis to predict molecular groupings, i.e., $C_1$, $C_2$-$C_5$, and $C_6$+. Physics based parametric models have been proposed to predict molecular composition of crude oils from NMR measurements of relaxation time and diffusion coefficient distributions (see Heaton and Freedman, U.S. Pat. No. 6,859,032). However, it is difficult using physics models to properly account for different molecular shapes (e.g., aromatic and aliphatic hydrocarbon molecules), pressure and temperature effects, and dissolved gases.

It is was among the objects of the referenced copending application Ser. No. 10/836,788 to provide a method for determination of formation fluid characteristics which overcomes shortcomings of prior art approaches.

The above-referenced copending U.S. patent application Ser. No. 11/014,324 relates, inter alia, to techniques for borehole compensation whereby the effects of the borehole are reduced or eliminated when determining characteristics of the surrounding formations, such as the electrical conductivity thereof. As described in the background portion of that Application, induction logging has provided important measurements of formation conductivity for many years. Conventional induction logging tools use coils that have magnetic moments with their axes aligned with the tool axes. Techniques have been developed and employed for relatively accurate compensation for borehole effects in these tools. More recently, some induction logging tools employ antennas with magnetic dipole moments oriented in both the longitudinal (i.e., axial) direction, and transverse directions.

Modern induction logging tools, such as the 3-dimensional induction tool described in Rosthal et al., "Field Tests of an Experimental Fully Tri-axial Induction Tool", Paper QQ, presented at the SPWLA 44$^{th}$ Annual Logging Symposium, Galveston, Tex., Jun. 22-25, 2003, acquire large numbers of signals that must be corrected for the effects of the borehole prior to processing the corrected signals to obtain estimates of the formation conductivity tensor. 3-D induction tools are designed to have azimuthal, radial, and axial sensitivity so that the measured signals are sensitive to the conductivity anisotropy and the radial and axial conductivity distributions of the earth formations penetrated by the borehole. In a Cartesian co-ordinate system fixed in the logging sonde, the axial direction is along the direction of the sonde axis (i.e., borehole). Multiple depths of investigation are achieved by employing several (e.g. nine) receivers spatially separated in the axial direction from the transmitter. Each antenna coil has an associated magnetic dipole moment vector whose magnitude is proportional to the product of the cross-sectional area of the coil and the amplitude of the electrical current in the coil. The direction of the magnetic moment vector is normal to the plane of the coil. The directional sensitivity to the formation conductivity distribution is derived from antennas with magnetic dipole moments oriented in both the longitudinal (i.e., axial direction) and transverse directions. In an example of a 3D induction tool described hereinbelow, the transmitter comprises a tri-axial antenna (e.g., solenoidal coils with dipole moments in the longitudinal and two orthogonal transverse directions). The three shortest spacing receivers each have a single longitudinally oriented antenna whereas the six other receivers are tri-axial. The short spacing receivers acquire signals at a single frequency, whereas the six other receivers acquire signals at two frequencies. In induction logging the transmitter is energized by an alternating current that causes alternating currents to flow in the conductive formation and borehole surrounding the logging sonde. The currents induce voltages in the receiver coils that are in-phase (i.e., resistive) and ninety degrees out-of-phase (i.e., reactive) with respect to the transmitter current. The in-phase component is called the R-signal and the out-of-phase component is called the X-signal. A phase-sensitive detector is used to measure both components. A complex or phasor voltage can represent the R and X-channel signals. Each complex voltage includes two distinct measured signals. The set of measured receiver voltages are sensitive to the radial and axial distributions of formation conductivity, and the borehole signal. The measured signals need to be corrected to remove the effects of the borehole and therefore obtain a set of so-called borehole corrected signals. The borehole corrected signals would then be processed to determine, for example, the formation conductivity distribution and anisotropy.

The degree of difficulty of the borehole correction problem for the described type of 3-D induction tool surpasses that of prior art conventional induction tools. One reason is that the 3-D induction tool with several receivers acquires a much greater number of signals than prior tools. For example, the above 3-D induction tool acquires 234 signals (117 complex voltages) at each measured depth in the borehole, whereas a previous generation tool acquires approximately one-tenth as many signals. Transverse magnetic dipole (TMD) transmitter coils can create axial borehole currents that produce receiver signals with very large borehole effects, which is another reason why correcting the 3-D induction tool signals for borehole effects is more challenging than for conventional induction tools. TMD transmitter coils can excite long-range longitudinal (i.e., axial) currents in the borehole that can couple very strongly into the receiver coils. On the other hand, conventional induction tools have longitudinally oriented transmitter and receiver coils that produce borehole and formation currents that flow in planes transverse to the axial or borehole direction and therefore the receiver signals they excite have by comparison smaller borehole signals.

Aside from the large number of data channels, the limitations of prior art methods for computing borehole corrected signals for a 3-D induction tool stem also from the fact that the borehole signal for each data channel depends in a non-linear and complex fashion on numerous quantities including: borehole radius, mud conductivity, near wellbore formation conductivity, formation conductivity anisotropy factor, and tool position or standoff for an eccentered tool. For previous generation induction tools, the borehole signal did not typically depend on conductivity anisotropy or on the direction of the standoff.

The dependence of the borehole effect on the direction of the standoff for a TMD transmitter can be understood by a simple symmetry argument. A TMD coil excites circular current loops transverse to the direction of the dipole moment. By symmetry arguments, for a centered tool in a circular borehole, there is no net current flow in the direction of the receivers because there are equal and opposite currents flowing in the axial (borehole) direction. The same symmetry argument holds in circular boreholes if the coil is eccentered in a direction parallel to the dipole moment of the coil. In these cases the borehole effect on a received signal from a TMD transmitter is no worse than that from a coil with a longitudinal magnetic dipole (LMD) moment. The symmetry is broken, however, if the coil is displaced in a direction perpendicular to the dipole moment. In the latter case there is a net axial current that can strongly couple into the receiver coils and result in a larger borehole effect than that for a LMD transmitter having receiver coils at the same spacings. Consider the standoff direction for a TMD transmitter whose dipole moment is oriented along the x-direction. The direction of the standoff can be described by the unit vector, $\hat{n} = \hat{x} \cos \phi + \hat{y} \sin \phi$, where $\phi$ is the azimuthal angle measured from the x-direction. A displacement of the dipole along the x-direction from the center of the borehole corresponds to $\phi = 0$ degrees whereas a displacement along the y-direction corresponds to $\phi = 90$ degrees. In general, the standoff direction and the magnitude of the standoff will correspond to an arbitrary and usually unknown value of the azimuthal angle.

If all of the aforementioned parameters upon which the borehole signal depends were known during logging operations, then a forward model consisting of a formation penetrated by a borehole could be used to invert the 3-D induction raw measurements and determine the formation electrical properties. This approach is not viable because some of the parameters upon which the borehole effect depends are typically either not known (e.g., conductivity anisotropy, standoff) or only known approximately. Alternatively, an inversion might be used to determine both borehole and formation properties. But the latter approach is not viable either, because the computations would be computationally too intensive to be performed in real time during logging operations.

Various techniques for implementing borehole correction are disclosed in the following prior documents: "Real-Time Environmental Corrections for the DIT-E Phasor Dual Induction Tool" by T. Barber published by the Soc. of Prof. Well Log Analysts, $26^{th}$ Annual Logging Symposium, Dallas, Paper EE, 1985; "Accurate Logging in Large Boreholes" by C. Kienitz et al. published by the Soc. of Prof. Well Log Analysts, $27^{th}$ Annual Logging Symposium, Paper III, 1986; U.S. Pat. No. 5,041,975; and U.S. Pat. No. 6,381,542. The techniques of these documents have one or more of the following limitations: use of charting that is not viable for a 3D induction tool; parameterization based on less complex tool responses; difficult empirical estimation of parameters; and/or use of algorithms that exhibit impractical convergence.

It was among the objects of the referenced copending application Ser. No. 11/014,324 to overcome limitations of prior art techniques with regard to borehole correction, particularly in complex tools, and to provide a method that: (1) does not require knowledge of the borehole parameters, (2) does not require or use a forward model to invert the measured signals, and (3) can be used to predict borehole corrected signals in substantially real time.

It is among the objects of the present invention to provide an improved method for determining characteristics of earth formations from measurements on the formations, the method avoiding certain problems and practical limitations that are encountered when prior art inversion techniques, if even available at all, are utilized.

SUMMARY OF THE INVENTION

The present invention is directed to a method for determining one or more characteristics of earth formations from measurements taken on said formations. As used herein, earth formations includes in situ formations and, also, extracted formations and their matrix and/or fluid constituents. The invention is useful, inter alia, in situations where an inversion is traditionally needed to infer formation characteristics that would have resulted in the actual measurements, but the techniques hereof do not require complex physics based equations representative of tool characteristics and formation response, or use of a forward model which is sometimes established in the prior art and, for example, iteratively modified in an attempt to determine formation characteristics.

In accordance with the invention, a method is set forth for determining a characteristic of earth formations from measurements taken on said formations, comprising the following steps: producing a data base that includes a multiplicity of data points, each data point representing a stored formation characteristic output related to a stored input measurement; deriving, from said data base, a mapping function; deriving an input formation measurement value; and determining an output formation characteristic value from said data base, said mapping function, and said input formation measurement value. The mapping function is preferably a weighted sum of non-linear functions.

In accordance with a preferred form of the invention, a method is set forth for determining a characteristic of earth formations from measurements taken on the formations, including the following steps: producing a data base that includes a multiplicity of data points, each data point representing a stored formation characteristic output related to a stored input measurement; deriving, from said data base, a radial basis function mapping function; deriving an input formation measurement value; and determining, using radial basis function interpolation, an output formation characteristic value, from said data base, said mapping function, and said input formation measurement value.

An embodiment of this form of the invention further comprises using the data base to determine parameters of said radial basis function mapping function. In one embodiment, the radial basis function mapping function includes weighting coefficients and non-linear radial basis functions, and the data base is used to determine said weighting coefficients and the widths of said non-linear radial basis functions.

The formation measurement value may comprise, for example, and without limitations, one or more measurement values from electrical logging, nuclear logging, sonic logging, or fluid sampling devices.

In accordance with another preferred form of the invention, a method is set forth for determining a characteristic of earth formations from measurements taken on said formations, comprising the following steps: producing a data base that includes a multiplicity of data points, each data point representing a stored m-dimensional formation characteristic output vector related to a stored n-dimensional input measurement vector; deriving, from said data base, a radial basis function mapping function; deriving an n-dimensional input formation measurement value vector; and determining, using radial basis function interpolation, an output m-dimensional formation characteristic value vector, from said data base, said mapping function, and said input formation measurement value.

An embodiment of this form of the invention further includes repeating said steps of deriving an input formation measurement value vector for different depth levels in a borehole and of determining said output formation characteristic value vector for said different depth levels, and further includes producing a log of said output formation characteristic value vector as a function of depth level.

Further features and advantages of the invention will become more readily apparent from the following detailed description when taken in conjunction with the accompanying drawings.

BRIEF DESCRIPTION OF THE DRAWINGS

In FIGS. 6-10 the predicted (circles) and target (triangles) responses agree to four or more decimal places and cannot be distinguished from one another on the plot. Only the 39 diagonal R-channel couplings are non-zero, as expected. FIG. 11 shows a failure case.

DETAILED DESCRIPTION

Figure 1:
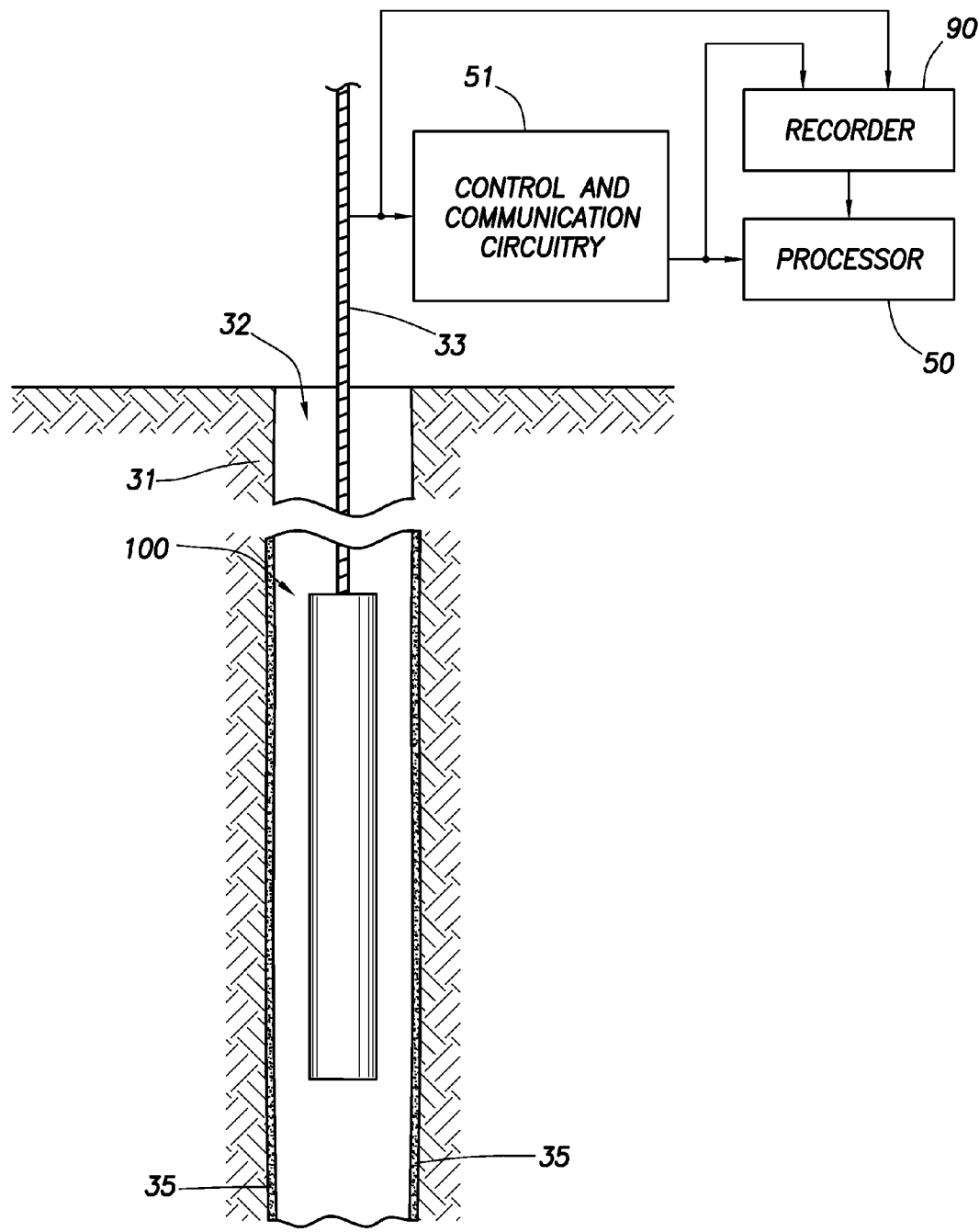
FIG. 1 is a diagram, partially in block form, of logging apparatus of a type that can be used in practicing embodiments of the invention.
Figure 2A:
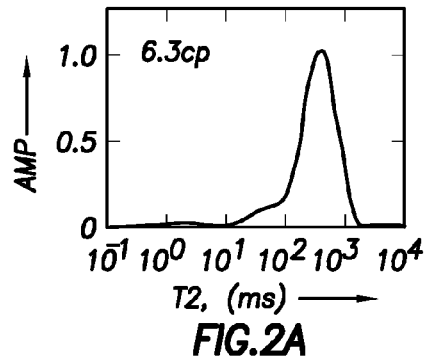
FIG. 2 shows graphs of $T_2$ distributions for sixteen samples of Table 1 used in an example.
Figure 2E:
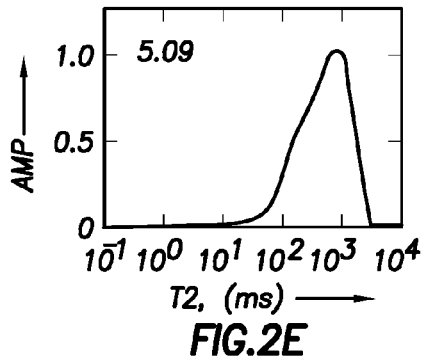
Figure 2B:
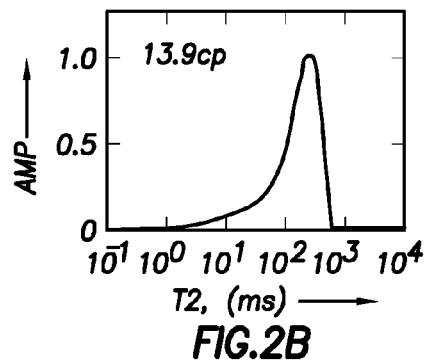
Figure 2F:
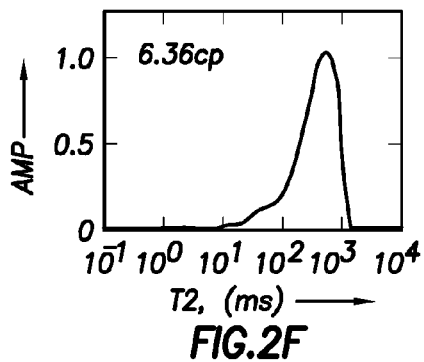
Figure 2C:
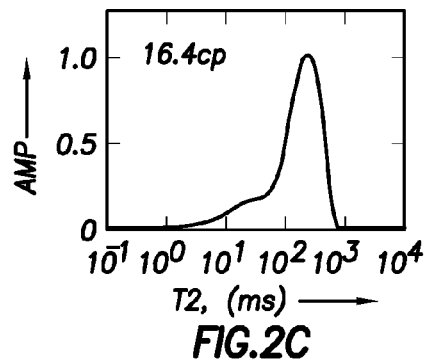
Figure 2G:
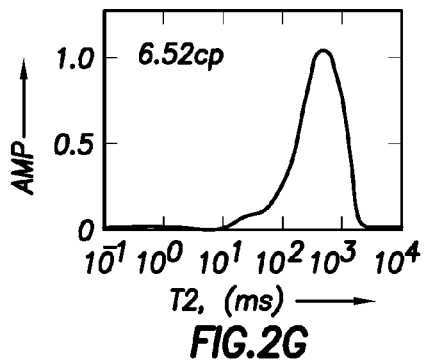
Figure 2D:
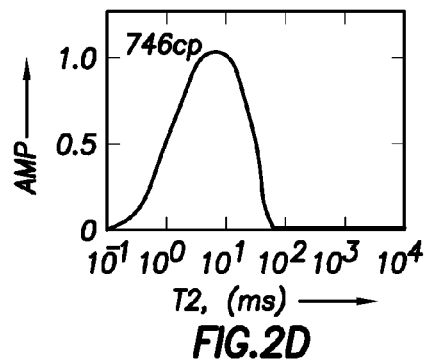
Figure 2H:
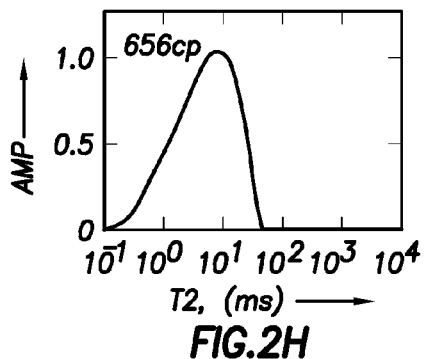
Figure 2I:
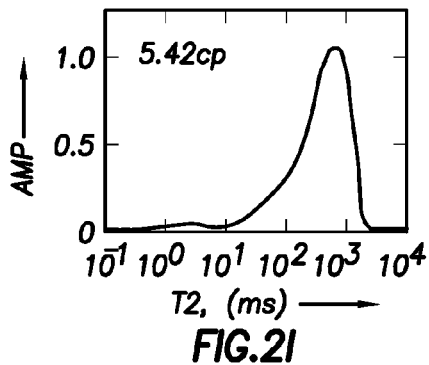
Figure 2M:
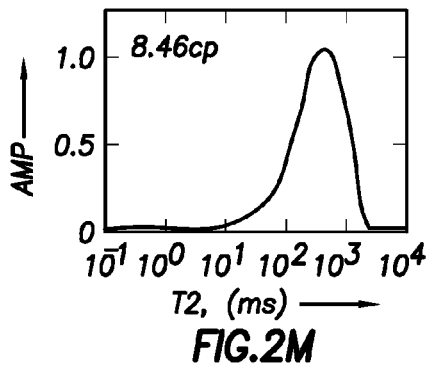
Figure 2J:
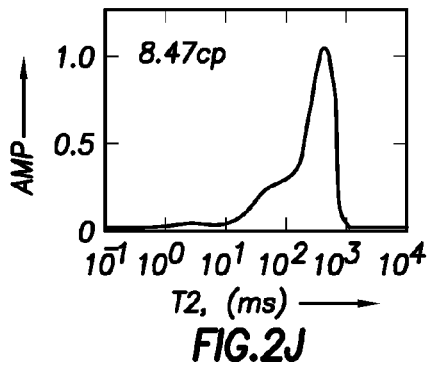
Figure 2N:
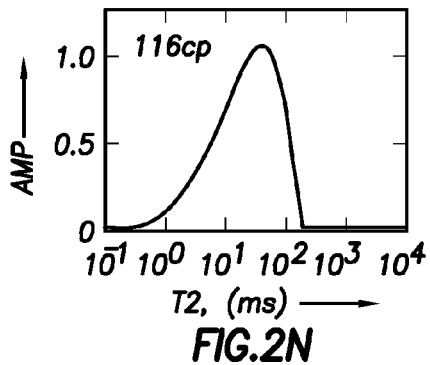
Figure 2K:
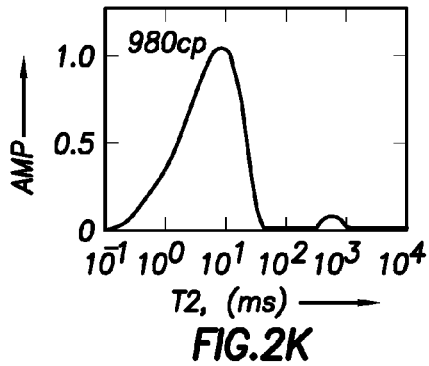
Figure 2O:
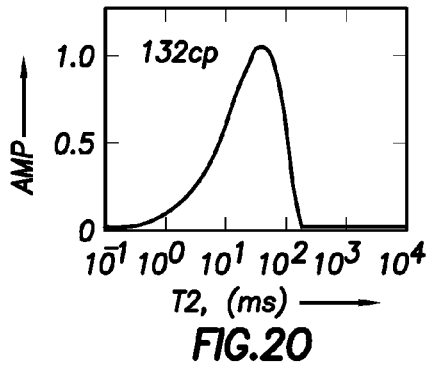
Figure 2L:
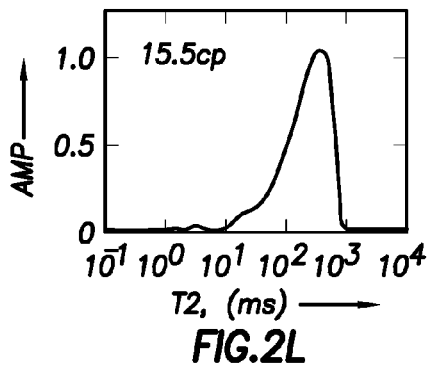
Figure 2P:
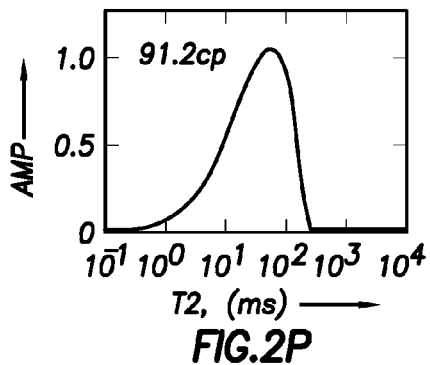

FIG. 1 shows the borehole 32 that has been drilled in formations 31, in known manner, with drilling equipment, and typically using drilling fluid or mud that results in a mudcake represented at 35. A logging device 100 is shown, and can be used in practicing embodiments of the invention. The device or tool 100 is suspended in the borehole 32 on an armored multiconductor cable 33, the length of which substantially determines the depth of the device 100. Known depth gauge apparatus (not shown) is provided to measure cable displacement over a sheave wheel (not shown) and thus the depth of logging device 100 in the borehole 32. Circuitry 51, shown at the surface although portions thereof may typically be downhole, represents control and communication circuitry for the investigating apparatus. Also shown at the surface are processor 50 and recorder 90.

The tool 100 can represent any type of logging device that takes measurements from which formation characteristics can be determined, and, for example, may have been determined in the past by solving complex inverse problems. For example, without limitation, the logging device may be an electrical type of logging device (including devices such as resistivity, induction, and electromagnetic propagation devices), a nuclear logging device, a sonic logging device, or a fluid sampling logging device, as well as combinations of these and other devices. Devices may be combined in a tool string and/or used during separate logging runs. Also, measurements may be taken during drilling and/or tripping and/or sliding. Some examples, again without limitation, of the types of formation characteristics that can be determined using these types of devices are as follows: determination, from deep three-dimensional electromagnetic measurements, of distance and direction to faults or deposits such as salt domes or hydrocarbons; determination, from acoustic shear and/or compressional wave speeds and/or wave attenuations, of formation porosity, permeability, and/or lithology; determination of formation anisotropy from electromagnetic and/or acoustic measurements; determination, from attenuation and frequency of a rod or plate vibrating in a fluid, of formation fluid viscosity and/or density; determination, from resistivity and/or nuclear magnetic resonance (NMR) measurements, of formation water saturation and/or permeability; determination, from count rates of gamma rays and/or neutrons at spaced detectors, of formation porosity and/or density; and determination, from electromagnetic, acoustic and/or nuclear measurements, of formation bed thickness.

Radial basis functions are used in practicing the invention, and some theory relating to radial basis functions will next be described.

Let $\vec{f}(\vec{x})$, $\vec{x} \in R^m$, and $\vec{f} \in R^m$, be a real valued vector function of n variables, and let values of $\vec{f}(\vec{x}_i) \equiv \vec{y}_i$ be given at N distinct points, $\vec{x}_i$. The interpolation problem is to construct function $\vec{F}(\vec{x})$, that approximates $\vec{f}(\vec{x})$ and satisfies the interpolation equations, $$\vec{F}(\vec{x}_i) = \vec{y}_i, \; i=1,2,\ldots,N \tag{1}$$

RBF interpolation chooses an approximating or mapping function of the form, $$\vec{F}(\vec{x}) = \sum_{i=1}^{N} \vec{w}_i \varphi(\|\vec{x} - \vec{x}_i\|). \tag{2}$$

The non-linear functions, φ, are known as radial basis functions (RBF). The arguments of the RBF depend on the Euclidean norm in the n-dimensional space, i.e., $$\|\vec{x} - \vec{x}_i\| = \sqrt{\sum_{m=1}^{n} (x_m - x_{m,i})^2}. \tag{3}$$

The functions are called radial because they depend only on the distance, and not the direction, of $\vec{x}_i$ from an arbitrary input vector, $\vec{x}$, at which the function is to be evaluated.

The weights, $\vec{w}_1$ in Eq. (2) are determined by requiring that the interpolation equations (1) be satisfied. Therefore the weights are a linear combination of the given function values, $$\vec{w}_i = \sum_{j=1}^{N} \Phi_{i,j}^{-1} \vec{y}_j, \quad (4)$$

where $\Phi_{i,j} = \phi(\|\vec{x}_i - \vec{x}_j\|)$ is the, N×N, interpolation matrix. One of the nice features of radial basis functions is that for certain functional forms that include Gaussians, multiquadrics, and inverse multiquadrics, mathematicians have proven that the interpolation matrix is non-singular (e.g., Micchelli, "Interpolation of scattered data: Distance matrices and conditionally positive definite functions," *Constructive Approximation*, v. 2, 11-22, 1986). This means that the mapping function in Eq. (2) can be uniquely determined. Radial basis function interpolation has other attractive properties not possessed by classical interpolation schemes such as polynomial splines or finite difference approximations. First, radial basis function interpolation is more accurate than classical methods for the approximation of multivariate functions of many variables. Second, radial basis function interpolation does not require the data to be on a uniform lattice and has been shown to work well with scattered data sets (M. Buhmann, *Radial Basis Functions: Theory and Implementation*, 2003, Cambridge University Press). Third, numerical experiments have shown the somewhat surprising result that for a given number of data points, N, the accuracy of the interpolation is independent of the number of independent variables, n, even for very large n (M. J. D. Powell, "Radial basis function methods for interpolation to functions of many variables," presented at the 5$^{th}$ Hellenic-European Conference on Computer Mathematics and its Application, 1-23, 2001).

The foregoing introduced radial basis function interpolation from a mathematical point of view. Next will be treated how the use of radial basis functions for approximating functions of many variables can be used to solve inverse problems.

The inverse problems of interest in well logging and geophysical settings involve predicting the physical properties of some underlying system, given a set of measurements. Consider a data base having a set of input data $\vec{x}_i \in R^n$ (i.e., the inputs are n-dimensional vectors) and a set of corresponding real outputs, $\vec{y}_i \in R^m$, for i=1, ..., N where N is the number of cases in the data base. In the mathematical language of RBF interpolation the $\vec{y}_i$ represent samples of the function that one wants to approximate and $\vec{x}_i$ are the distinct points at which the function is given. The data base inputs, $\vec{x}_i$, represent the measurements from which one would like to predict the physical properties of the underlying system. The data base outputs, $\vec{y}_i$, are the physical properties one wants to predict from the measurements. The data base is used to construct a mapping function such that given measurements, $\vec{x}$, not in the data base, one can predict the properties, $\vec{y}(\vec{x})$, of the physical system consistent with the measurements. The mapping function solves the inverse problem by predicting the physical properties of the system from the measurements.

For this approach to work there must exist a deterministic and discernible relation between the input measurements and the properties one would like to predict from those measurements. Also, corresponding to each $\vec{x}_i$ in the data base there should be only one output, $\vec{y}_i$. There can, however, be different input measurements in the data base that correspond to the same data base output. This is familiar from the definition of an algebraic function for which, $\vec{x}_i$, is the independent variable and $\vec{y}(\vec{x})$ is the dependent variable or function. For each $\vec{x}$ there should be only one value of the function, $\vec{y}(\vec{x})$, but different values of $\vec{x}$ can correspond to the same value of $\vec{y}$.

An example of the construction and use of a data base in accordance with the principles hereof is set forth in the above-referenced U.S. patent application Ser. No. 10/836,788 incorporated herein by reference, in which the viscosities of crude oils are determined from NMR measurements. NMR theory and experiments both show that viscosity can be predicted from NMR measurements of relaxation times and diffusion coefficients, but the existing empirical correlations relating NMR measurements to viscosity can have large errors. Radial basis function interpolation can be used to provide more accurate predictions. As described in the referenced copending Application, a data base is constructed by acquiring NMR measurements on a suite of N oil samples over a representative range of viscosities, temperatures, and pressures. The inputs to the data base would be, for each oil sample, a vector whose elements are the NMR data (e.g., the amplitudes in a T2 or diffusion coefficient distribution) for that sample and the measurement temperature and pressure. The data base outputs are the properties to be predicted. In this example, the data base outputs are obtained by measurement, using a viscometer, of the viscosity for each oil sample at the same temperature and pressure as the NMR measurements. Using this data base, a radial basis mapping function can be constructed so that oil viscosity can be predicted from NMR, temperature, and pressure measurements.

The radial basis functions used in embodiments hereof are normalized Gaussian radial basis functions defined by the equation, $$\varphi(\|\vec{x} - \vec{x}_i\|) = \frac{\exp\left(-\frac{\|\vec{x} - \vec{x}_i\|^2}{2s_i^2}\right)}{\sum_{j=1}^{N} \exp\left(-\frac{\|\vec{x} - \vec{x}_j\|^2}{2s_j^2}\right)}. \quad (5)$$

[Other radial basis functions, for example, without limitation, exponential, multiquadrics, or inverse multiquadrics, could be used.] These functions are normalized in the sense that the summation over the data base inputs, $\vec{x}_i$, is equal to unity for all $\vec{x}$, i.e., $$\sum_{i=1}^{N} \varphi(\|\vec{x} - \vec{x}_i\|) = 1. \quad (6)$$

It is also easily seen from Eq. (5) that, $$\phi(\|\vec{x} - \vec{x}_i\|) \leq 1. \quad (7)$$

Combining Eqs. 2 and 5, the mapping function for Gaussian radial basis functions can be written as $$\vec{F}(\vec{x}) = \frac{\sum_{i=1}^{N} \vec{w}_i \exp\left(-\frac{\|\vec{x}-\vec{x}_i\|^2}{2s_i^2}\right)}{\sum_{i=1}^{N} \exp\left(-\frac{\|\vec{x}-\vec{x}_i\|^2}{2s_i^2}\right)}. \quad (8)$$

The width, $s_i$, of the Gaussian radial basis function centered at $\vec{x}_i$ is representative of the range or spread of the function in the input space. The optimal widths, for accurate approximations, should be of the order of the nearest neighbor distances in the input space. The idea is to pave the input space with basis functions that have some overlap with nearest neighbors but negligible overlap for more distant neighbors. This ensures that for an input $\vec{x}$ that is not in the data base the output $\vec{F}(\vec{x})$ will be computed as a weighted average of contributions from those data base inputs $\vec{x}_i$ that are nearest to $\vec{x}$.

In practical applications, good results can often be obtained by using a single width parameter (s) for all of the basis functions. Likewise it is sometimes useful to select a subset of the data base input vectors for the centers of the radial basis functions. In this case the interpolation matrix is not square but can nevertheless be inverted, for example, using a pseudo inverse. For very large data bases one can choose a subset of the data base input vectors by using a clustering algorithm to consolidate groups of nearby inputs. Optimal widths for the radial basis functions can be determined by selecting widths comparable to nearest neighbor Euclidean distances separating the input vectors. The following discusses an approximation for the weight vectors and provides some intuitive insight into how the radial basis mapping function interpolates in the data base to predict the output vectors.

An intuitive understanding of how the mapping function in Eq. 8 predicts an output vector for an input vector not in the data base can be gained by considering the Nadaraya-Watson Regression Estimator (NWRE). The NWRE is based on a simple approximation for the weight vectors (S. Haykin, *Neural Networks: A Comprehensive Foundation*, Prentice Hall, Hamilton Ontario, Canada, 1999). The interpolation equations for the mapping function in Eq. 8 can be written in the form, $$\vec{F}(\vec{x}_j) = \frac{\vec{w}_j + \sum_{\substack{i=1 \\ i \neq j}}^{N} \vec{w}_i \exp\left(-\frac{\|\vec{x}_j - \vec{x}_i\|^2}{2s_i^2}\right)}{1 + \sum_{\substack{i=1 \\ i \neq j}}^{N} \exp\left(-\frac{\|\vec{x}_j - \vec{x}_i\|^2}{2s_i^2}\right)}. \quad (9)$$

The summations in Eq. (9) can be neglected if one neglects the overlap of the data base radial basis functions. The NWRE approximation assumes that the interpolation matrix in Eq. 4 is diagonal and leads to a simple approximation for the weight vectors, $$\vec{F}(\vec{x}_j) \cong \vec{y}_j = \vec{w}_j. \quad (10)$$

This simple approximation replaces the weight vectors in Eq. 8 by the data base output vectors, $\vec{y}_i$. It turns out that for many practical problems the NWRE approximation works very well and it is always a good starting point. Computing the weights using Eq. (4) provides a refinement to the approximation.

Combining Eqs. (8) and (10) one finds the NWRE mapping function, $$\vec{F}(\vec{x}) \cong \frac{\sum_{i=1}^{N} \vec{y}_i \exp\left(-\frac{\|\vec{x}-\vec{x}_i\|^2}{2s_i^2}\right)}{\sum_{i=1}^{N} \exp\left(-\frac{\|\vec{x}-\vec{x}_i\|^2}{2s_i^2}\right)}. \quad (11)$$

Note that in the limit of very large $s_i$, $\vec{F}(\vec{x})$ approaches the sample mean of the data base output vectors. In the limit of very small $s_i$, $\vec{F}(\vec{x})$ approaches the output vector $\vec{y}_j$ corresponding to the data base input vector $\vec{x}_j$ that is closest to $\vec{x}$. In general, $\vec{F}(\vec{x})$ is a weighted average of the data base output vectors with weighting factors determined by the closeness of $\vec{x}$ to the data base input vectors. It can be observed that the NWRE approximation in Eq. 11 does not satisfy the interpolation conditions in Eq. 1.

The NWRE approximation can be improved upon by determining optimal weight vectors such that the interpolation equations are satisfied. The problem is linear if the widths of the Gaussian radial basis functions are fixed. The interpolation conditions lead to a set of linear equations for the weight vectors whose solution can be written in matrix form, i.e., $$W = \Phi^{-1} \cdot Y \quad (12)$$

where the, N×m, matrix, W, is given by, $$W = \begin{bmatrix} w_{1,1} & w_{1,2} & \cdots & w_{1,m} \\ w_{2,1} & w_{2,2} & \cdots & w_{2,m} \\ \vdots & \vdots & \vdots & \vdots \\ w_{N,1} & w_{N,2} & \cdots & w_{N,m} \end{bmatrix} \quad (13)$$

where the i-th row of W is the transpose of the weight vector for the i-th data base case. That is, the first subscript on each weight runs from 1 to N and denotes a particular data base case and the second subscript denotes a particular element of the data base output vectors and runs from 1 to m. The matrix $\Phi$ whose inverse appears in Eq. 12 is the, N×N, positive definite matrix of Gaussian radial basis functions, i.e., $$\Phi = \begin{bmatrix} \varphi_{1,1} & \varphi_{1,2} & \cdots & \varphi_{1,N} \\ \varphi_{2,1} & \varphi_{2,2} & \cdots & \varphi_{2,N} \\ \vdots & \vdots & \vdots & \vdots \\ \varphi_{N,1} & w_{N,2} & \cdots & \varphi_{N,N} \end{bmatrix} \quad (14)$$

where the matrix elements are the normalized Gaussian radial basis functions, $$\varphi_{i,j} = \frac{\exp\left(-\frac{\|\vec{x}_i - \vec{x}_j\|^2}{2s_j^2}\right)}{\sum_{j=1}^{N}\exp\left(-\frac{\|\vec{x}_i - \vec{x}_j\|^2}{2s_j^2}\right)}. \quad (15)$$

The N×m matrix, Y in Eq. 12 contains the data base output vectors, e.g., $$Y = \begin{bmatrix} y_{1,1} & y_{1,2} & \cdots & y_{1,m} \\ y_{2,1} & y_{2,2} & \cdots & y_{2,m} \\ \vdots & \vdots & \vdots & \vdots \\ y_{N,1} & y_{N,2} & \cdots & y_{N,m} \end{bmatrix}. \quad (16)$$

Note that the i-th row is the transpose of the data base vector $\vec{y}_i$. The solution for the weights given in Eqs. 12-16 improves on the NWRE approximation by determining optimal weight vectors with the caveat of having fixed widths for the Gaussian radial basis functions.

Examples are next set forth of applications of radial basis interpolation to solve three important and difficult well logging inversion problems. (See the above-referenced copending U.S. patent application Ser. Nos. 10/836,788 and 11/014,324, incorporated herein by reference). The first problem to be addressed is the prediction of crude oil viscosity and molecular composition from NMR measurements. This has importance to downhole fluid analysis, which is a rapidly developing area of well logging technology. The second problem addressed is predicting borehole corrected data from raw signals acquired by a fully Tri-Axial 3-D induction-logging tool. The third application is the prediction of fluid density and composition from Near Infrared (NIR) absorption measurements, such as an NIR optical spectrometer in a logging tool.

In accordance with an aspect hereof, radial basis function interpolation can be used to predict more accurate viscosity estimates than possible using existing correlations. This is an example of an inversion problem for which an accurate forward model does not exist. It is instructive to first review the empirical correlations used by the existing methods (R. Freedman et al., "A new NMR method of fluid characterization in reservoir rocks: Experimental confirmation and simulation results," *SPE Journal*, v. 6, No. 4, 452464, 2001). The existing methods rely on the following empirical equations to estimate viscosity (η), $$\eta = \frac{aT}{T_{2,LM} f(gor)} \quad (17)$$

and, $$\eta = \frac{bT}{D_{LM}}. \quad (18)$$

Eqs. 17 and 18 provide estimates of viscosity from NMR measurements of the transverse magnetization relaxation time ($T_2$) and diffusion coefficient distributions (D), respectively. In Eq. 17, the longitudinal magnetization relaxation time ($T_1$) distribution can be used in place of $T_2$. T is temperature in degrees Kelvin and f(gor) in Eq. 17 is an empirically determined function of the gas-oil ratio (R. Freedman et al., "A new NMR method of fluid characterization in reservoir rocks: Experimental confirmation and simulation results," *SPE Journal*, v. 6, No. 4, 452-464, 2001). In both equations the viscosity estimate is inversely proportional to the logarithmic mean (i.e., $T_{2,LM}$ and $D_{LM}$) of the distribution. Thus, the correlations do not account for the fact that the shapes of the distributions can affect the viscosity. Furthermore, the empirical constants, a and b, are determined from "best fits" to the assumed regression form for the equations. The empirical constants in these equations are not universally appropriate for all crude oils and the variances in these constants can cause significant errors in estimated viscosities. Another shortcoming of these correlations is that they do not account for the effects of pressure (M. Winkler et al., "The limits of fluid property correlations used in NMR well logging: An experimental study of reservoir fluids at reservoir conditions," paper DD, in the Transactions of the 45$^{th}$ Society of Professional Well Log Analysts Annual Meeting, 2004).

The prediction of viscosity from NMR measurements using radial basis function interpolation can be viewed as constructing the non-linear mapping from a vector input (e.g., amplitudes in a $T_1$, $T_2$, or D distribution) to a scalar output (viscosity) given a suite of input-output examples. The following example uses $T_2$ distributions to illustrate the technique with the understanding that similar methodology works for D and $T_1$ distributions. Consider a data base of N input-output pairs whose inputs for each live oil sample include $T_2$ distribution amplitudes ($\vec{A}_i$), temperatures ($T_i$), pressures ($P_i$), gas-oil ratios ($gor_i$) and corresponding output viscosities ($\eta_i$). The viscosity for a crude oil sample not in the data base can be predicted using the equation, $$\eta = \frac{\sum_{j=1}^{N} w_j \exp\left(-\frac{\|\vec{A} - \vec{A}_j\|^2}{2s_j^2}\right) \cdot \exp\left(-\frac{(T-T_j)^2}{2s_T^2}\right) \cdot \exp\left(-\frac{(P-P_j)^2}{2s_P^2}\right) \cdot \exp\left(-\frac{(gor-gor_j)^2}{2s_g^2}\right)}{\sum_{j=1}^{N} \exp\left(-\frac{\|\vec{A} - \vec{A}_j\|^2}{2s_j^2}\right) \cdot \exp\left(-\frac{(T-T_j)^2}{2s_T^2}\right) \cdot \exp\left(-\frac{(P-P_j)^2}{2s_P^2}\right) \cdot \exp\left(-\frac{(gor-gor_j)^2}{2s_g^2}\right)}. \quad (19)$$

The viscosity of a live crude oil can be predicted using Eq. 19 and the measured inputs: $T_2$ distribution amplitudes ($\vec{A}$), temperature (T), pressure (P), and gas-oil ratio (gor). Note that the measured inputs can be separated in the radial basis functions because of the factorizability of Gaussian functions. For simplicity a single width was assigned to the Gaussian functions containing T, P, and gor. A borehole fluid sampling tool equipped with pressure and temperature sensors and an NMR sensor (as in the copending U.S. patent application Ser. No. 10/836,788) could provide the measurements needed to predict viscosity using Eq. 19. The gas-oil ratio is available if the sampling tool is also equipped with optics for measuring optical density of the crude oil versus wavelength in the near infrared region (G. Fujisawa et al., "Analyzing reservoir fluid composition in situ in real time: Case study in a carbonate reservoir," SPE Paper 84092, in the Transactions of the Society of Petroleum Engineers Annual Technical Conference and Exhibition, 2003). The accuracy of the predictions made by Eq. 19 relies on having a data base with a well-paved input space of live oil measurements. Note that only the $T_2$ distribution amplitudes and not the relaxation times appear in Eq. 19. The mapping function does not depend on the relaxation times provided that all of the amplitudes in the equation span the same range of $T_2$ values. The maximum amplitude of the $T_2$ distributions was normalized to one prior to constructing the mapping function. This step insures that differences in the amplitudes of the measured distributions caused by hardware or software calibrations are removed by the normalization. Equation 19 is readily generalized if the data base also includes other measurements. For example, if in addition to the $T_2$ distribution amplitudes the data base includes D and $T_1$ distributions, then the amplitude vectors for these measurements would appear as additional Gaussian factors in Eq. 19.

Viscosity prediction using Eq. 19 was tested using a small data base of $T_2$ distributions and corresponding measured viscosities acquired on a suite of 16 dead (i.e., gor=0) crude oil samples at a temperature of 30° C. at atmospheric pressure. The measured viscosities are shown in Table 1. The measured $T_2$ distributions are shown in FIG. 2. The viscosity was measured for each sample using a laboratory viscometer.

TABLE 1

Measured Viscosities of 16 Dead Crude Oils

| Sample | Measured Viscosity (cp) |
|---|---|
| 1 | 6.30 |
| 2 | 13.9 |
| 3 | 16.4 |
| 4 | 746.0 |
| 5 | 5.09 |
| 6 | 6.36 |
| 7 | 6.52 |
| 8 | 656.0 |
| 9 | 5.42 |
| 10 | 8.47 |
| 11 | 980.0 |
| 12 | 15.5 |
| 13 | 8.46 |
| 14 | 116.0 |
| 15 | 132.0 |
| 16 | 91.2 |

Figure 3:
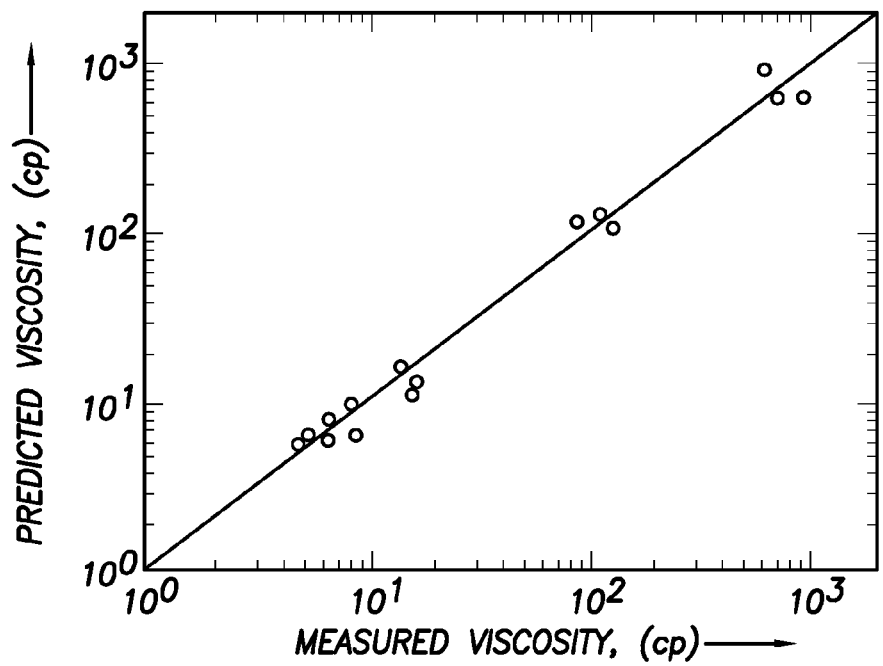
FIG. 3 shows a graph of predicted viscosity, using an approach of an embodiment of the invention, versus measurement viscosity for the example using the sixteen samples of Table 1.

Note that although samples 10 and 13, counting by rows from left to right and from top to bottom, have virtually identical viscosities their $T_2$ distributions have quite different log means. Specifically, sample 10 has a log mean of 174 ms whereas sample 13 has a log mean of 279 ms. This clearly shows the inadequacy of the prior art empirical correlation in Eq. 17, which would predict viscosities that differ by a factor of 1.6. FIG. 3 shows the viscosities predicted from the $T_2$ distributions using the radial basis mapping function, $$\eta = \frac{\sum_{j=1}^{N} w_j \exp\left(-\frac{\|\vec{A} - \vec{A}_j\|^2}{2s_j^2}\right)}{\sum_{j=1}^{N} \exp\left(-\frac{\|\vec{A} - \vec{A}_j\|^2}{2s_j^2}\right)} \quad (20)$$

appropriate for a data base of dead oils all measured at the same temperature and pressure. The results in FIG. 3 were obtained using the "leave one out method" whereby each sample was removed from the data base and its viscosity was predicted from the remaining 15 samples in the data base. One can see that the viscosities predicted from the $T_2$ distributions using Eq. 20 are in very good agreement with the viscosities measured in the laboratory. This is especially impressive considering the small size of the data base. The predicted viscosities shown in FIG. 3 were obtained by choosing, $s_j=0.1$ for j=1, 2, ..., N. This heuristic choice for the widths provided a good match between the predicted and measured viscosities.

The prediction error, e.g., the sum of the squares of the differences between the predicted and target (i.e., measured viscosities), has a narrow minimum near 0.1. It was found that comparable results to those shown in FIG. 3 can be obtained if the widths are set to 0.15; however, the prediction errors increased noticeably if the widths were increased to say 0.2 and beyond. These results are consistent with the intuitive notion that the optimal widths should be of the order of the nearest neighbor distances in the input space. Table 2 shows the Euclidean nearest neighbor (NN) distances for the $T_2$ distributions in the data base. The NN distances provide a good starting point for choosing the widths. In this example choosing the Gaussian widths to be about 0.3 times the NN distances provides accurate predictions. The weights in Eq. 20 were computed using two methods: (1) the NWRE approximation was used to replace the weights by the data base outputs (i.e., the laboratory measured viscosities) and (2) the weights were computed from the interpolation equations. The NWRE approximation provided good results and, in this case, very little improvement was achieved by computing the weights.

Figure 4:
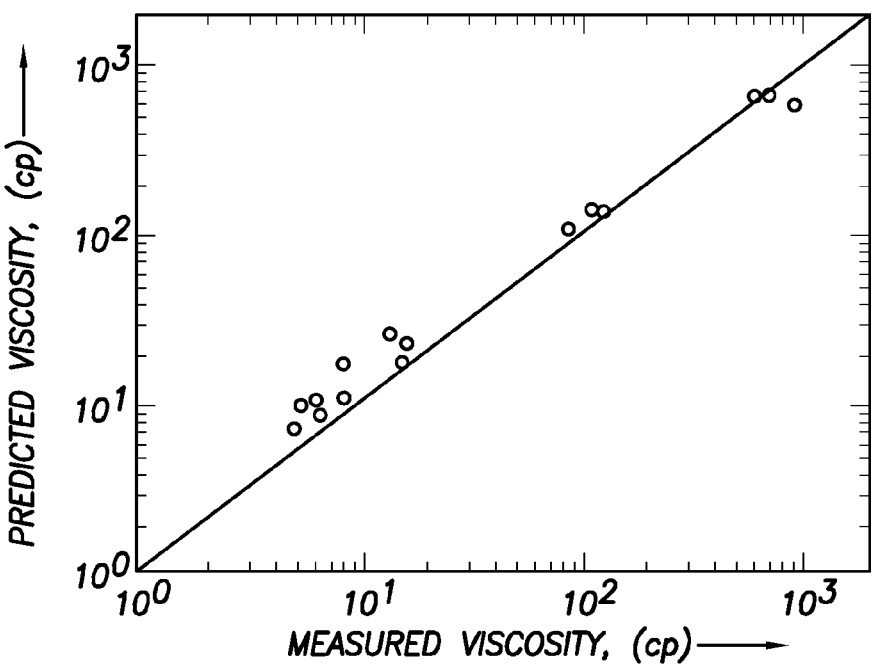
FIG. 4 shows a graph of predicted viscosity, using a prior art approach, versus measured viscosity for the example using the sixteen samples of Table 1.
Figure 5A:
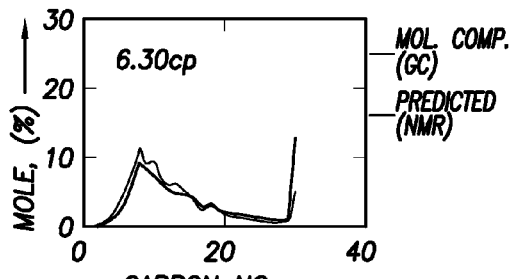
FIG. 5 shows graphs, for each of the sixteen samples of the example, of mole composition versus carbon number, for both predicted compositions and flashed liquid compositions from gas chromatography (GC).
Figure 5E:
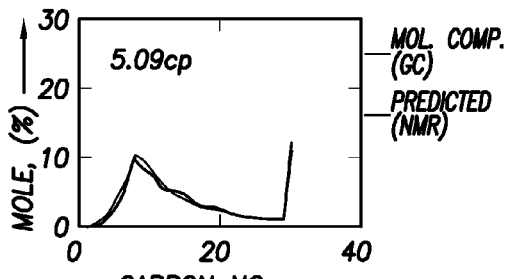
Figure 5B:
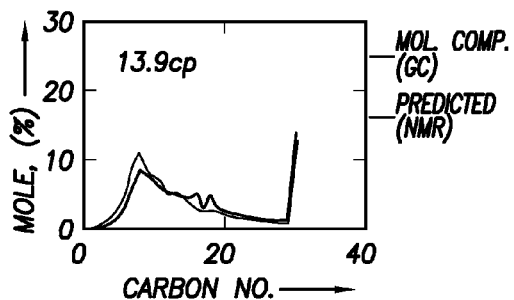
Figure 5F:
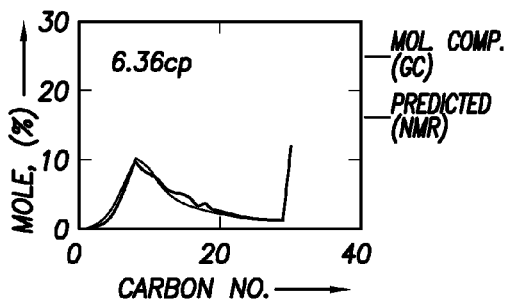
Figure 5C:
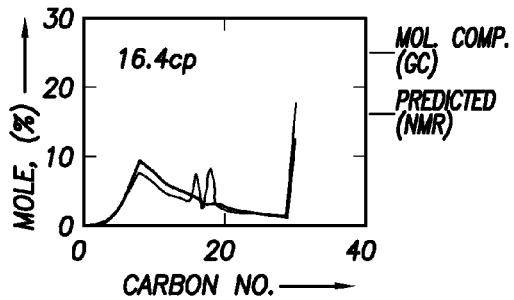
Figure 5G:
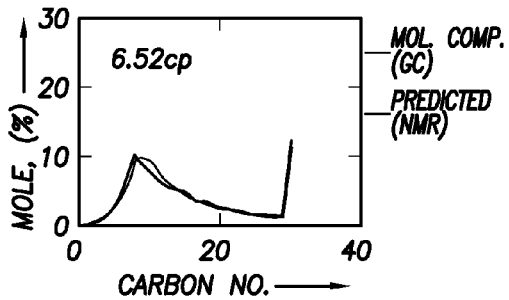
Figure 5D:
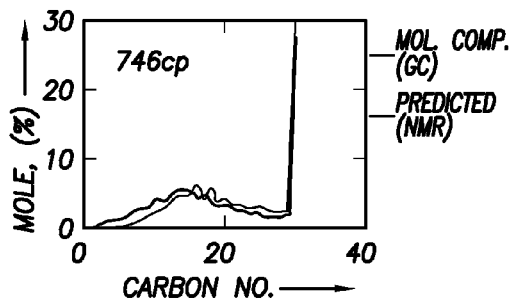
Figure 5H:
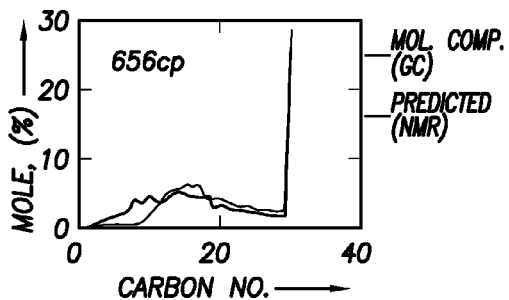
Figure 5I:
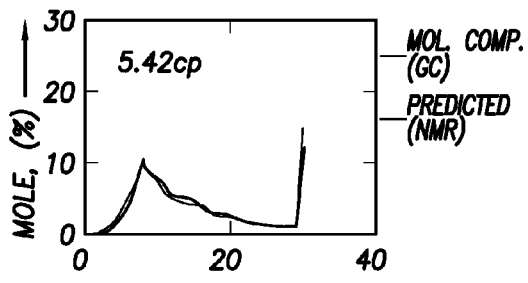
Figure 5M:
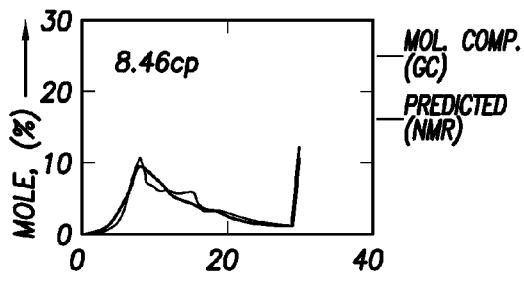
Figure 5J:
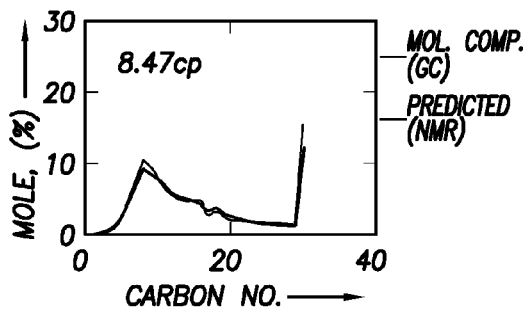
Figure 5N:
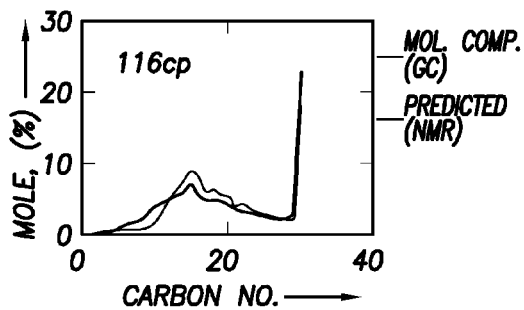
Figure 5K:
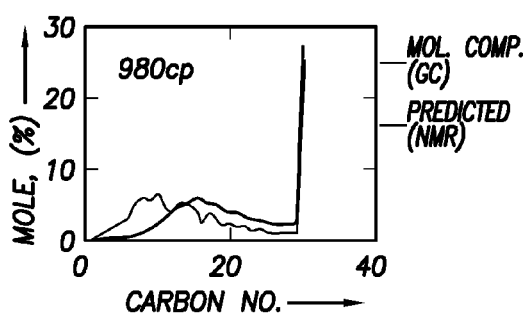
Figure 5O:
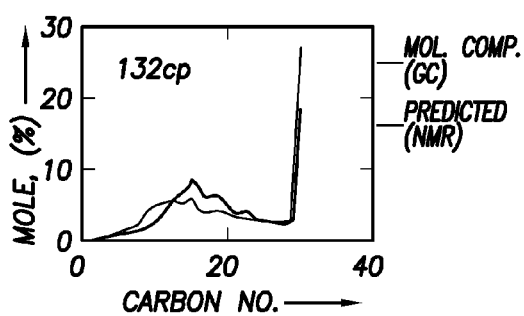
Figure 5L:
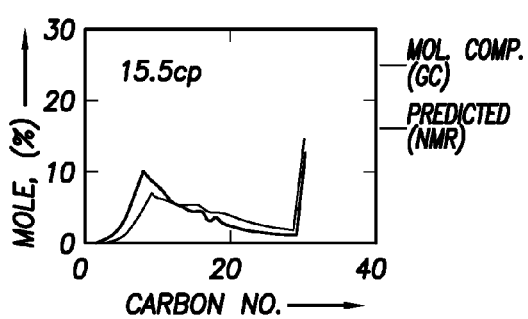
Figure 5P:
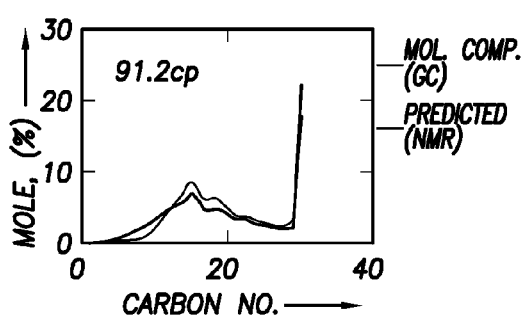
Figure 6:
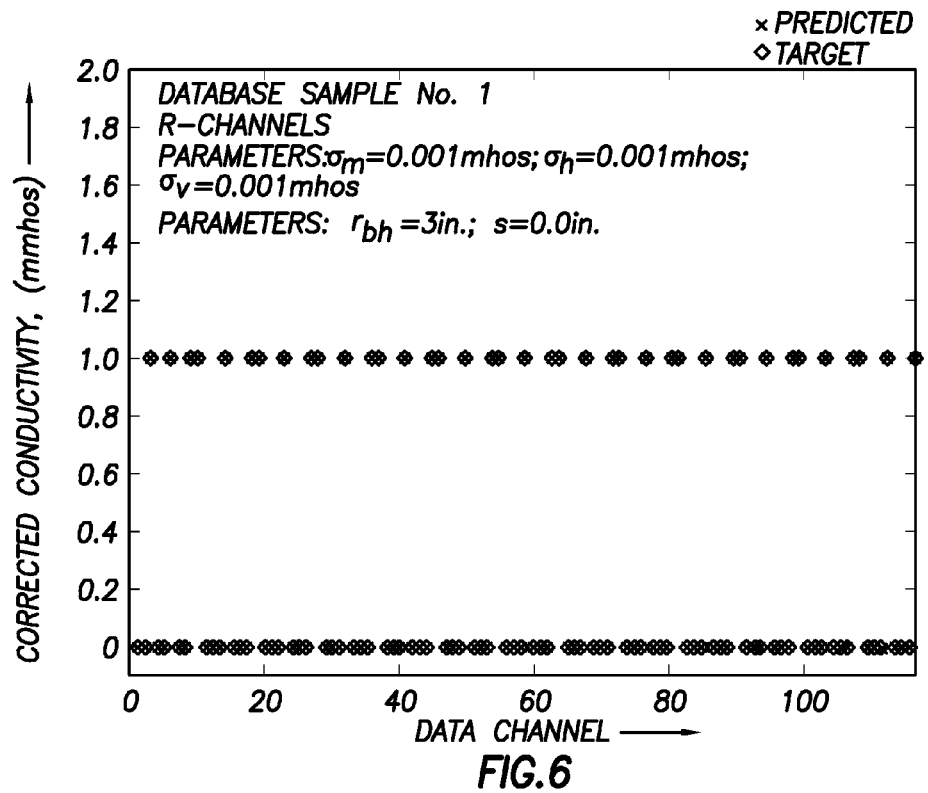
FIGS. 6-12 show graphs of predicted and target responses for illustrative examples. The parameters for each case are shown in the respective Figures.
Figure 7:
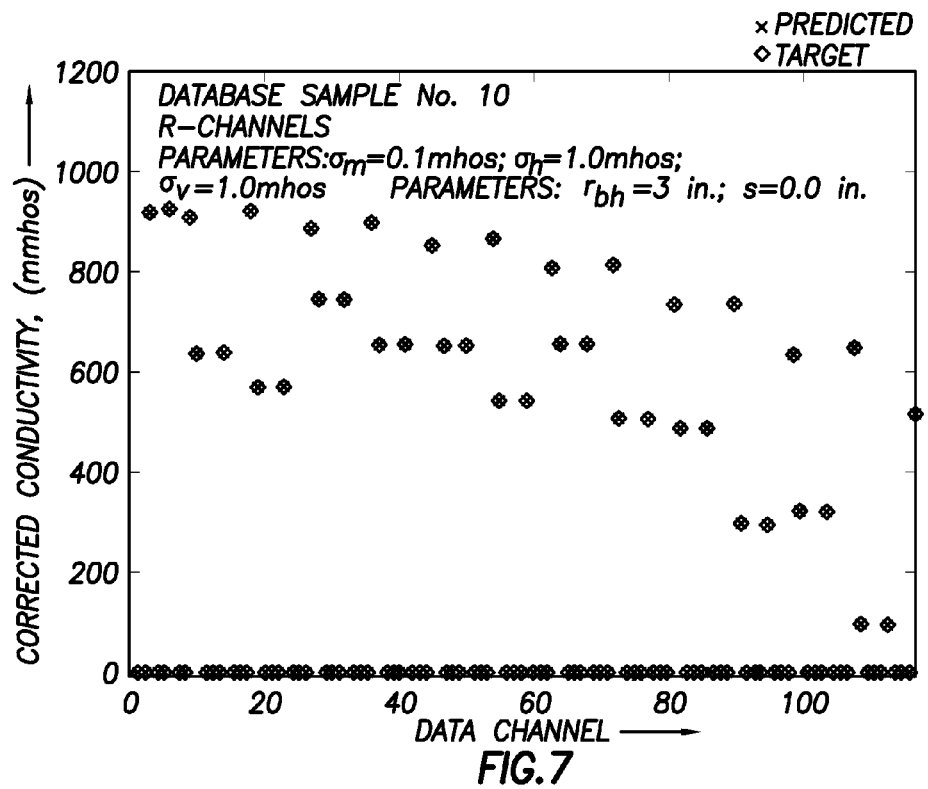
Figure 8:
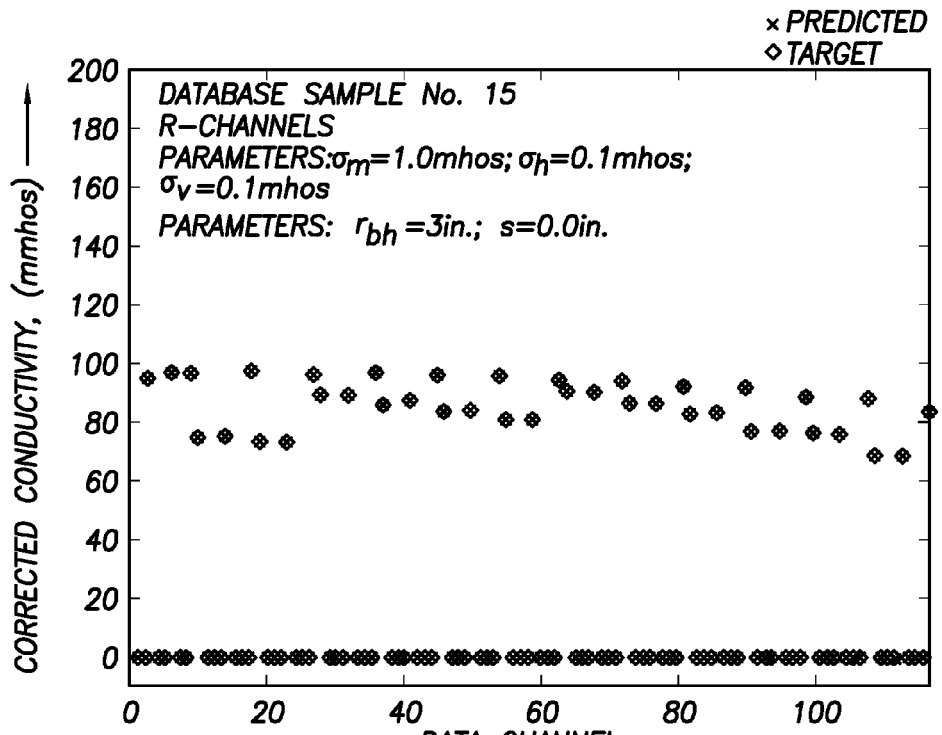

The viscosities of the samples in Table 1 were also estimated from the log means of the $T_2$ distributions shown in FIG. 2. A value a=9.558 was used for the correlation parameter in Eq. 17. In the literature a range of a values from 4.0 to 9.558 has been cited. This large spread in correlation parameters leads to uncertainties of the order of a factor of two for viscosities predicted from the log means of crude oil $T_2$ distributions. The comparison of the viscosities predicted from the log means with the measured viscosities is shown in FIG. 4. One can see from FIGS. 3 and 4 that the RBF predicted viscosities are in much better agreement with the measured viscosities than are those predicted from the log means. The agreement between predicted and measured viscosities for the lower viscosity range in FIG. 3 can be improved by reducing the value of the parameter, a, used in Eq. 17, but this causes poorer agreement at the higher viscosities. The real advantage of the RBF method is that there are no model-dependent parameters and the fact that the method lends itself to measurements made on live oils at elevated temperatures and pressures.

TABLE 2

Nearest Neighbor (NN) Distances

| Sample No. | NN Distances |
|---|---|
| 1 | 0.39 |
| 2 | 0.24 |
| 3 | 0.24 |
| 4 | 0.35 |
| 5 | 0.58 |
| 6 | 0.39 |
| 7 | 0.31 |
| 8 | 0.31 |
| 9 | 0.40 |
| 10 | 0.65 |
| 11 | 0.31 |
| 12 | 0.66 |
| 13 | 0.31 |
| 14 | 0.26 |
| 15 | 0.26 |
| 16 | 0.46 |

It is well established that NMR measurements of relaxation time and diffusion coefficient distributions provide information on the molecular composition of crude oils (R. Freedman et al., "A new NMR method of fluid characterization in reservoir rocks: Experimental confirmation and simulation results," *SPE Journal*, v. 6, No. 4, 452-464, 2001). Previous work on predicting composition from NMR measurements has attempted to derive physics based models that relate composition to relaxation time and molecular diffusion coefficient distributions (Freed, U.S. Patent Application Publication 2004/0253743 A1, Dec. 16, 2004; Heaton and Freedman, U.S. Pat. No. 6,859,032). The derivation of accurate physics based models is difficult because crude oils are complex mixtures containing hydrocarbon molecules with a wide range of shapes, weights, and sizes. This problem is therefore the kind of problem for which radial basis function interpolation offers an elegant model-independent method of solution. The prediction of composition was tested on the same data base of 16 dead crude oils used above for the prediction of viscosity. For the prediction of composition, the data base inputs are the $T_2$ distributions shown in FIG. 2 and the outputs are the corresponding compositions, which were measured using gas chromatography. The radial basis mapping function is similar to the one for predicting viscosity except that the mapping function and the weights are both m-dimensional vectors where m is the number of constituents in the compositions measured by the gas chromatography. The compositions measured using gas chromatography for the data base oil samples consisted of the mole fractions for carbon numbers C1-C29 and C30+. The compositions predicted from the $T_2$ distributions using radial basis functions are shown in FIG. 5. The NWRE approximation was used for the weights. The predictions were essentially insensitive to the widths of the radial basis functions over a range of widths from about 0.1 to 1.0. It is seen that there is good agreement between the predicted compositions and those measured by gas chromatography. This agreement is impressive because of the relatively small size of the data base. The composition was predicted for each of the 16 samples by sequentially removing that sample from the data base and then using the remaining 15 samples to construct the mapping function. The poorer predictions for the three most viscous samples in the data base are caused by the fact there are only three viscous oils in the data base.

The next application of radial basis functions shows how they can be used to correct a tri-axial induction tool (called a "3-D induction tool") for borehole effects. (See the copending U.S. patent application Ser. No. 11/014,324.) The same approach can also be used to correct other types of open and cased-hole logging tool measurements (e.g., resistivity, sonic, nuclear) for borehole effects.

The 3-D induction tool provides an especially good example of the power of radial basis function interpolation for solving difficult inverse problems because of the complexity and magnitude of the borehole effects on the tool response. The degree of difficulty of the borehole correction problem for the 3-D induction tool far surpasses that of previous induction tools. One reason is that the 3-D induction tool acquires a much greater number of signals than prior induction tools. This example of an induction tool acquires 234 signals at each sampling interval in the borehole, compared to 28 or fewer signals for the previous generation induction tool. Transverse magnetic dipole (TMD) transmitter coils create axial borehole currents that produce receiver signals with very large borehole effects, which is another reason why correcting the 3-D induction tool signals for borehole effects is more challenging than for conventional induction tools. TMD transmitter coils can excite long-range longitudinal (i.e., axial) currents in the borehole that can couple very strongly into the receiver coils. On the other hand, conventional induction tools have longitudinally oriented transmitter and receiver coils that produce borehole and formation currents that flow in planes transverse to the axial or borehole direction and therefore the receiver signals they excite have by comparison smaller borehole signals.

The 3-D induction tool is designed to have azimuthal, radial, and axial sensitivity so that the measured signals are sensitive to the conductivity anisotropy and the radial and axial conductivity distributions of the earth formations penetrated by the borehole. An example of a 3-D induction logging tool of a type that can be used in practicing an embodiment hereof is described in R. Rosthal et al., "Field Test Results Of An Experimental Fully-Triaxial Induction Tool," Paper QQ in the Transactions of the SPWLA 44th Annual Logging Symposium, Galveston, June, 2003. The triaxial antennas (transmitting or receiving) include a conventional longitudinal antenna (with its axis in the z-direction) and two orthogonal transverse antennas. The antennas can be collocated or non-collocated. The three most closely spaced receiving antennas are conventional type longitudinal antennas, and the six successively longer spaced receiving antennas are triaxial receiving antennas. The transmitter operates at two frequencies. The three shorter spacing receiving antennas acquire signals at a single frequency, and the six longer spacing receiving antennas acquire signals at both frequencies. In induction logging the transmitter is energized by an alternating current that causes alternating currents to flow in the conductive formation and borehole surrounding the logging sonde. The currents induce voltages in the receiver coils that are in-phase (i.e., resistive) and ninety degrees out-of-phase (i.e., reactive) with respect to the transmitter current. The in-phase component is called the R-signal and the out-of-phase component is called the X-signal. A phase-sensitive detector is used to measure both components. A complex or phasor voltage can represent the R and X-channel signals. The number of distinct measured signals is twice the number of complex signals. Accordingly, in the present example there are 117 complex measurement signals (3×3×1+6×3×3×2) and 234 distinct measured signals. The set of measured receiver voltages are sensitive to the radial and axial distributions of formation conductivity, and the borehole signal.

The borehole signal for each data channel depends in a non-linear and complex fashion on numerous quantities including: borehole radius, mud conductivity, near wellbore formation conductivity, formation conductivity anisotropy factor, and tool position or standoff for an eccentered tool. The borehole effect may also depend on the direction of the anisotropy in a dipping formation or deviated well. For previous generation induction tools, the borehole signal did not depend on conductivity anisotropy or on the direction of the standoff.

If all of the aforementioned parameters upon which the borehole signal depends were known during logging operations, then a forward model consisting of a formation penetrated by a borehole could be used to invert the 3-D induction tool raw measurements and determine the formation electrical properties. This approach is not viable because some of the parameters upon which the borehole effect depends are typically either not known (e.g., conductivity anisotropy, standoff) or only known approximately. Alternatively, an inversion can be used to determine both borehole and formation properties. The latter approach is not viable because the computations are too intensive to be performed in real time during logging operations. In accordance with the principles hereof, radial basis function interpolation can be used to correct the 3-D induction tool raw tool measurements for borehole effects without having knowledge of the borehole parameters.

The 3-D induction tool measures 234 raw voltages that are induced in the receiver coils. After applying downhole electronic calibrations and gain corrections, the measured voltages are converted to fully calibrated raw apparent conductivities. It is the measured raw apparent conductivities that must be borehole corrected before further data processing is performed to estimate formation conductivity distributions.

A data base of raw (i.e., not corrected for borehole effects) apparent conductivities, $\vec{\sigma}_{a,i}^{(raw)}$ for $i=1, 2 \ldots N$ can be computed by solving Maxwell's equations for the 3-D induction tool in boreholes with radii ($r_i$), standoffs ($\vec{d}_i$), and mud conductivities ($\sigma_{m,i}$) which penetrate formations with vertical ($\sigma_{v,i}$) and horizontal ($\sigma_{h,i}$) conductivities. The modeled data base cases are for infinite, homogeneous, and "transversely anisotropic" media for which the horizontal conductivities in the planes perpendicular to the borehole are different from the vertical conductivities in the planes parallel to the borehole. The anisotropy parameter for a transversely anisotropic formation is defined by $$\lambda_a = \sqrt{\frac{\sigma_h}{\sigma_v}}. \tag{21}$$

The components of the raw apparent conductivity vectors, $\vec{\sigma}_{a,i}^{(raw)}$, are the R- and X-channel apparent conductivities determined either from all or a subset of the 234 transmitter-receiver couplings measured by the tool. The N data base cases correspond to choosing different values for the three borehole parameters and two formation parameters in the model. These parameters should each be selected to span a set of physically feasible values.

Borehole corrected apparent conductivities, $\vec{\sigma}_{a,i}^{(c)}$, for $i=1, 2 \ldots N$, can be computed by solving Maxwell's equations for the 3-D induction tool in an infinite transversely anisotropic homogeneous medium (e.g., without a borehole). From the raw and borehole corrected apparent conductivities one can compute a borehole correction, $\Delta \vec{\sigma}_{a,i}$, which by definition is $$\Delta \vec{\sigma}_{a,i} = \vec{\sigma}_{a,i}^{(raw)} - \vec{\sigma}_{a,i}^{(c)}. \tag{22}$$

The RBF mapping function for predicting the 234 borehole-corrected 3-D induction signals can be written in the form, $$\vec{\sigma}_a^{(c)} = \frac{\sum_{i=1}^{N} \vec{w}_i \exp\left(-\frac{\|\vec{\sigma}_a^{(raw)} - \vec{\sigma}_{a,i}^{(raw)}\|^2}{2s_i^2}\right)}{\sum_{i=1}^{N} \exp\left(-\frac{\|\vec{\sigma}_a^{(raw)} - \vec{\sigma}_{a,i}^{(raw)}\|^2}{2s_i^2}\right)}. \tag{23}$$

The weight vectors, $\vec{w}_i$, can be determined from equations similar to Eqs. 12-16. Observe that Eq. 23 can be used to predict borehole corrected data directly from the raw 3-D induction signals without having to know the six parameters on which the borehole effect depends (i.e., borehole radius, conductivity anisotropy, standoff, direction of standoff, borehole fluid conductivity, and near wellbore formation conductivity). It can be noted that, if desired, one can also use the data base to construct an RBF mapping function to predict the aforementioned parameters from the raw tool measurements (or likewise a mapping function to predict the borehole correction defined in Eq. 22). However, an advantage of the approach hereof for solving the borehole correction problem is that knowledge of these parameters is not required.

To demonstrate use of radial basis function interpolation for borehole correcting raw 3-D induction tool measurements, a sparsely populated data base of 3-D raw induction tool responses for the 234 data channels was computed. The data base was constructed using 5 values of $\sigma_m$, 6 values of $\sigma_h$, 3 values of anisotropy parameter ($\lambda_a$), 4 borehole radii, and 3 values of tool standoff. The raw tool responses represent the data base inputs. The anisotropy parameter is defined in Eq. (21). The induction tool responses for the 234 data channels were also computed for the same formation parameters without a borehole. These represent the homogeneous medium responses and are the data base outputs. After removing duplicate cases and some others that were not considered to be within physical limits for the tool or formation parameters a reduced data base consisting of 916 cases was tested. Each test involved removing a sample (i.e., case) from the data base and then using Eq. 23 to predict the borehole corrected responses for the 234 data channels of the 3-D induction tool. The weights used in Eq. 23 were computed from the data base interpolation equations. The widths ($s_j$) used in Eq. 23 were computed from the nearest neighbor distances ($NN_j$) of the input measurements. For the results shown here the widths were heuristically computed using the equation, $$s_j = 0.2 * NN_j. \tag{24}$$

The borehole corrected data predicted from Eq. (23) were compared with the homogeneous media (i.e., the data base formations without a borehole) tool responses for all 234 data channels. In the vast majority of cases, agreement to within 4 or more decimal places between the predicted borehole corrections and the target (i.e., the homogeneous medium responses) responses was found. The nearest neighbor distances for the 916 raw input measurements varied widely from a minimum distance of 0.32 to a maximum distance of 1241. This is clearly a case where using a single width for the radial basis function widths would be incorrect. For the raw measurement input vectors in Eq. 23 only a subset consisting of 177 of the 234 data channels was used. The 117 R-channel signals were all used but only 60 X-channel signals were used. This is a nice feature of the method that allows one the flexibility to exclude data that might be corrupted by noise or other factors. In the examples shown, the raw measurement inputs are all accurate, but some of the data was excluded just to make the point that all of the 3-D induction tool raw measurement channels are not needed for the borehole corrections.

Figure 9:
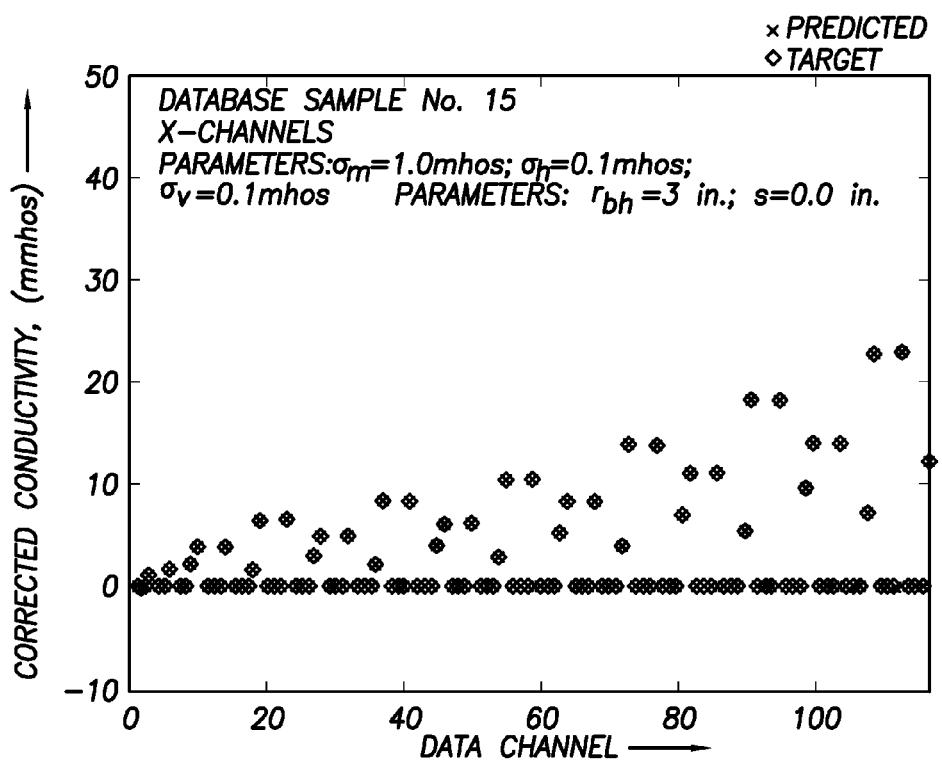
Figure 10:
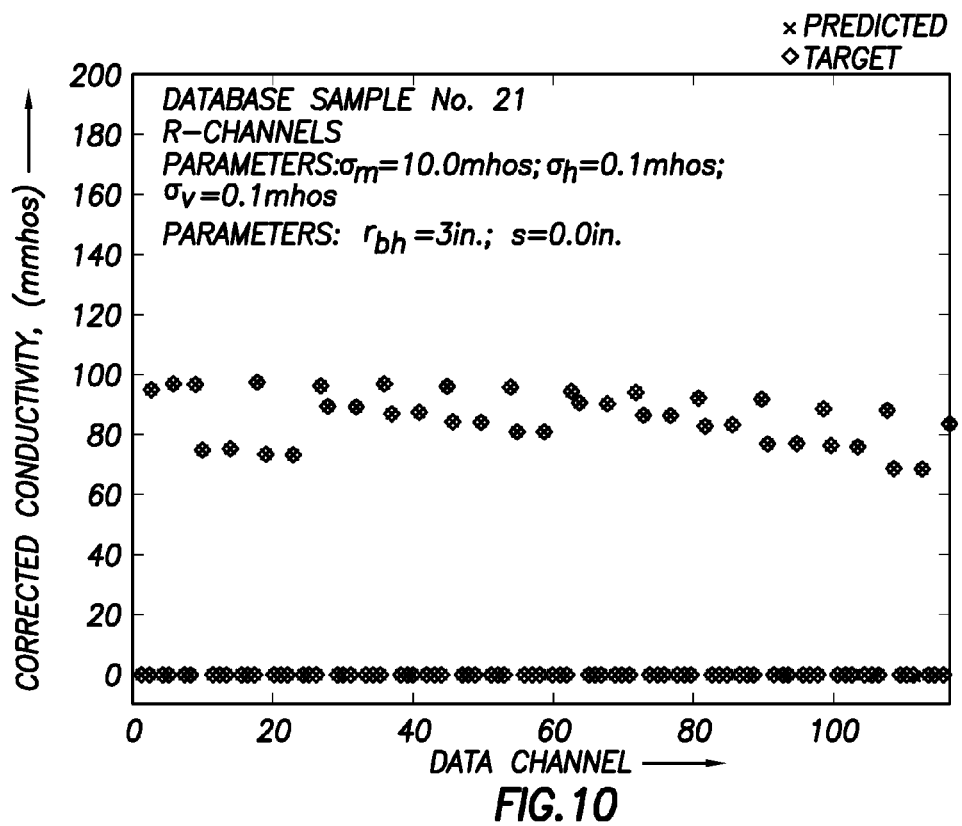

Some typical results are shown in FIGS. 6-12 for a few cases picked more or less at random from the data base. The conductivities in the plots are in units of mmhos (equal to the more familiar unit mS/m). Note that the 117 R-channel results are shown in the plots except for FIG. 9 where X-channel results are shown. The X-channel results are not displayed to save space since it has been found that whenever the R-channel borehole corrections agree with their target responses then the X-channel responses agree equally as well with their target responses (e.g., as can be seen from FIGS. 8 and 9). Note that in FIGS. 6-8 and 10-12 the non-zero values of the 117 borehole-corrected apparent conductivities are the 39 diagonal (e.g., $\sigma_{xx}$, $\sigma_{yy}$, $\sigma_{zz}$) R-channel couplings. In FIG. 9, the non-zero borehole corrected apparent conductivities are the 39 diagonal X-channel tool couplings. The off-diagonal couplings are all correctly predicted to be zero as expected for the tool response in a homogeneous medium.

Figure 11:
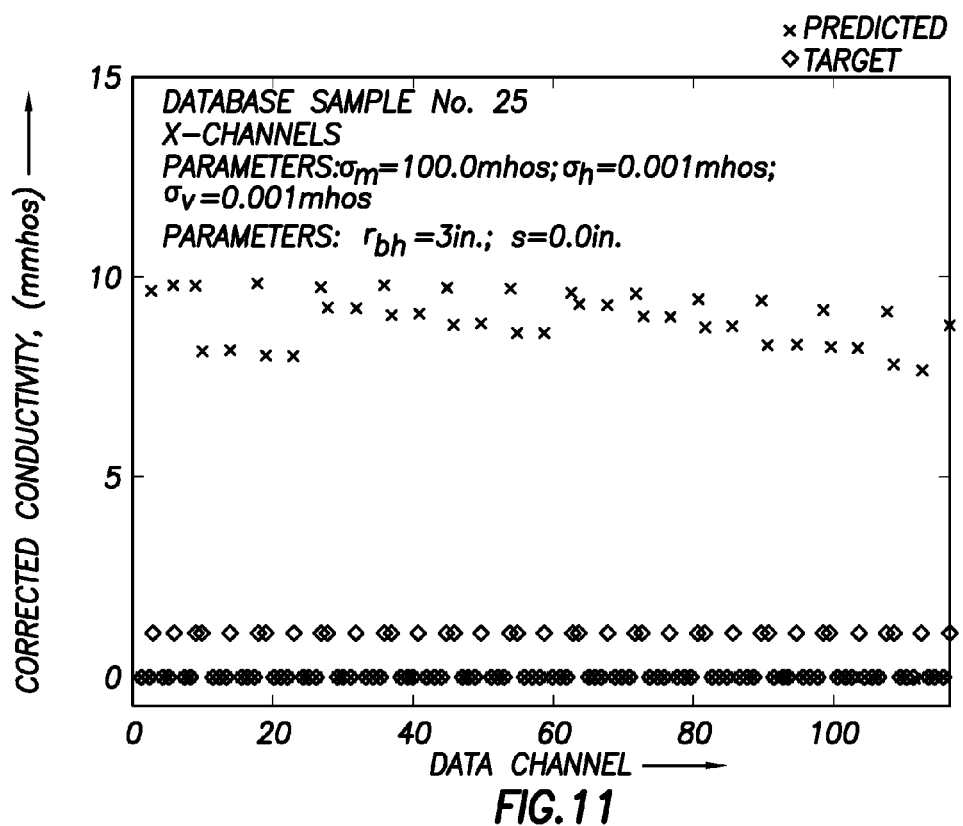

One of the failures is shown in FIG. 11. This case provides insight into how radial basis function interpolation would fail if the underlying data base were not adequately populated. It is worth looking closely at data base sample no. 25, which represents one of the extreme cases in the data base. For this case the borehole and formation parameters are: $\sigma_m$=100,000 mS/m, $\sigma_h$=1 mS/m, $\sigma_v$=1 mS/m, and the borehole radius is 3-inches. The tool was centered in the borehole (i.e., s=0). To compute the borehole corrected tool responses, case no. 25 was removed from the data base and the remaining 915 samples in the data base were used in Eq. 23 to predict the borehole corrections. The "nearest" sample in the data base is sample no. 26 which has identical borehole parameters as sample no. 25 but has different formation properties, e.g., $\sigma_h$=10 mS/m and $\sigma_v$=10 mS/m. As expected the borehole corrected predictions for sample no. 25 are close to 10 mS/m because sample no. 26 is the dominant contributor to the summation in Eq. 23. To correct this problem, the number of samples in the data base must be increased. The additional samples would have the same borehole parameters as sample no. 25 but would include samples with lower formation conductivities, e.g., closer to 1 mS/m.

Figure 12:
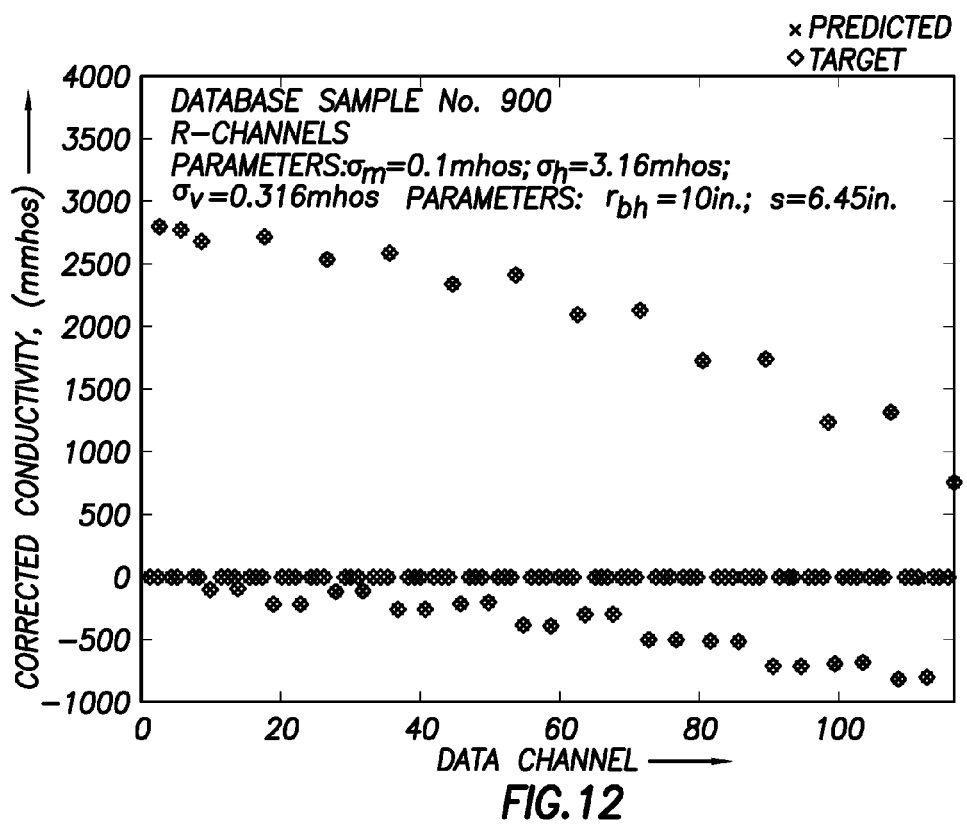

FIG. 12 shows the results for a data base case with a large tool standoff along the x-direction. When the standoff is in the x-direction, the raw tool measurements have non-zero values of the off-diagonal couplings, $\sigma_{xz}$ and $\sigma_{zx}$ (the other 4 off-diagonal couplings are zero). For the example shown in FIG. 12, as noted above, only the 39 diagonal R-channel couplings are non-zero, all the off-diagonal couplings are zero for the borehole corrected data as they should be for an anisotropic homogeneous medium without a borehole. This last example is particularly impressive of the strength of the technique because of the accurate removal of the large borehole effects on the off-diagonal raw measurements.

The next example relates to mass density and molecular compositional information predicted from NIR absorption measurements on live crude oils. The data base consisted of 14 live crude oils on which NIR absorption versus wavelength, gas/oil ratios, gas chromatography composition from C1 to C7+, and laboratory density measurements were available. Unfortunately, the temperatures and pressures at which the NIR measurements were performed were not available. Although, this lack of data compromises the analysis somewhat, the results illustrate advantages of the process. One of the motivations for applying RBF interpolation to the inversion of NIR data is that current inversion methods are based on Beer's law, which as discussed below is not strictly speaking applicable to fluids that are mixtures. An objective is to extract more and better fluid properties information from NIR data using RBF interpolation than is possible using the current methods.

The application of standard chemometric models and solutions (e.g., principal component analysis) based on Beer's law to predict compositions and gas/oil ratios of reservoir fluids from NIR absorption measurements made on live oil samples in the flowline of fluid sampling has been discussed in the literature. G. Fujisawa et al., "Analyzing reservoir fluid composition in situ in real time: Case study in a carbonate reservoir," SPE Paper 84092, in the Transactions of the Society of Petroleum Engineers Annual Technical Conference and Exhibition, 2003 discusses applying principal component analysis to invert models based on Beer's law and shows that weight percentages of molecular species with carbon numbers C1 (methane), C2-C5 (ethane through pentane), C6+ (hexane plus heavier components) and CO2 (carbon dioxide) can be predicted from downhole NIR absorption measurements.

It is instructive to discuss Beer's law and its limitations. Let wide-band NIR radiation be incident upon a fluid sample. The absorbance (also known as the optical density) at wavelength, $\lambda$, of the sample is defined by, $$A(\lambda) \equiv -\log_{10}\left(\frac{I(\lambda)}{I_o(\lambda)}\right) = \alpha \cdot c \cdot b. \tag{25}$$

$I_o$ and I are the incident and transmitted power of a beam of radiation that has traversed b centimeters of a homogeneous absorbing medium that contains c moles per liter of an absorbing substance with molar absorptivity equal to $\alpha$. The equality on the right hand side of Eq. 25 is known as Beer's law.

Note that the optical density is always greater than or equal to zero. An optical density equal to zero indicates that the sample is totally non-absorbing. An optical density equal to 1.0 indicates that 90% of the incident energy is absorbed, 2.0 means that 99% is absorbed, etc. NIR spectrometers usually measure the absorbance as a function of wavelength in the range from about 700 to 2500 nm. Some spectrometers measure the reflected radiation.

A derivation and discussion of Beer's law and its limitations can be found in D. A. Skoog and D. M. West, *Fundamentals of Analytic Chemistry*, Holt, Reinhart, and Winston, 1976, see p. 505-510. Chemometric models for predicting composition of mixtures that are based on Beer's law assume that the absorption of radiation by a complex mixture is equal to the sum of the absorptions that would be measured on the individual constituents of the mixture (H. M. Heise and R. Winzen, "Fundamental Chemometric Methods," in *Near-Infrared Spectroscopy*, Edited by H. W. Siesler et al., Wiley-Vch, 2002). This assumption ignores the fact that the absorption measured in a mixture can differ from the sum of the individual component absorptions because of molecular interactions between different constituents in the mixture.

Near-infrared radiation (NIR) is in that part of the electromagnetic (EM) spectrum that occupies the wavelength range from about 800 nanometers (nm) to 2500 nm. The adjacent region of the spectrum at longer wavelengths from about 2500 nm to 25,000 nm is called the mid-infrared (MIR). The energy of the radiation in the MIR part of the EM spectrum corresponds to fundamental mode excitations of molecular vibrations. Fundamental mode excitations are those from the ground state to the first excited level. For a polyatomic molecule with N atoms there are 3N-6 (3N-5 for a linear molecule) normal modes or fundamental vibration frequencies corresponding to various stretching, bending, and rocking modes.

The absorption peaks observed in the NIR for reservoir fluids correspond to excitations from the ground state to the second or third excited states. These absorptions are called first and second overtones. The second overtone mode has lower probability of excitation and therefore is less intense than the first overtone mode. Other absorption peaks known as combination modes are also observed in the NIR. Combinations are, for example, caused by the excitation of a C—H stretching mode plus one or more bending or rocking modes. Many different combination modes can be excited which contributes to the richness and complexity of the NIR region.

In the NIR region the absorption spectra of hydrocarbons are broader and have lower optical densities (i.e., are more transparent) than in the MIR region. As a result the association of peaks and structure in an NIR absorption spectra with specific functional groups or molecules is less straightforward than for MIR spectra.

L. G. Weyer, "Near-infrared spectroscopy of organic substances," in Applied Spectroscopy Reviews, v. 21, Nos. 1 & 2, discusses the NIR spectra of aliphatic and aromatic hydrocarbons, 1-43, 1985. As described therein, the first overtones of the C—H stretch mode for aliphatic hydrocarbons are found in the wavelength range from about 1600 to 1800 nm and the second overtones are in the range from about 1100 to 1250 nm. The first combination bands for aliphatic hydrocarbons are observed in the wavelength range between 2000 and 2400 nm and a second weaker band is observed from about 1300 and 1450 nm. For aromatic hydrocarbons the first overtone of the C—H stretch mode occurs at about 1685 nm and the second overtone occurs at about 1143 nm. Combination bands are found at about of 2150, 2460 with much weaker bands at 1420-1450 nm. Water has an O—H stretch first overtone at about 1440 nm and a second overtone at about 960 nm and an intense combination band from about 1960 to 2100 nm.

The use of radial basis function interpolation to predict reservoir fluid properties from NIR spectroscopy involves a straightforward application of the foregoing material. The first step is the construction of a data base of NIR absorbance and fluid properties pressure-volume-temperature (PVT) laboratory measurements (e.g., composition, density, gas/oil ratio, etc.) made on a representative suite of oils measured at different temperatures and pressures. The data base is then used to construct a mapping function to predict fluid properties from NIR absorbance measurements on oils that are not in the data base.

The data base used in this example consisted of 14 live crude oils on which molecular compositions, gas/oil ratios, and densities were measured along with optical densities (i.e., absorbances). The optical density data, acquired in the NIR wavelength range from 1000 to 2100 nanometers (nm), is shown in FIG. 13. Note that the optical densities are negative for some of the samples. This was caused by a measurement offset. The molecular composition data for the 14 oils in the data base were laboratory measured using gas chromatography (GC). The composition data consisted of mole percentages of molecules with carbon numbers C1 (methane), C2 (ethane), C3 (propane), i-C4 (iso-butane), n-C4 (normal butane), i-C5 (iso-pentane), n-C5 (normal pentane), C6 (hexane), and C7+ (heptane plus molecules with higher carbon numbers). As noted previously, this data base was not ideal because temperature and pressure data were not available. Also, if the GC measurements had included higher carbon numbers, the accuracy of the RBF predictions of the heavier components could have been tested.

Figure 15:
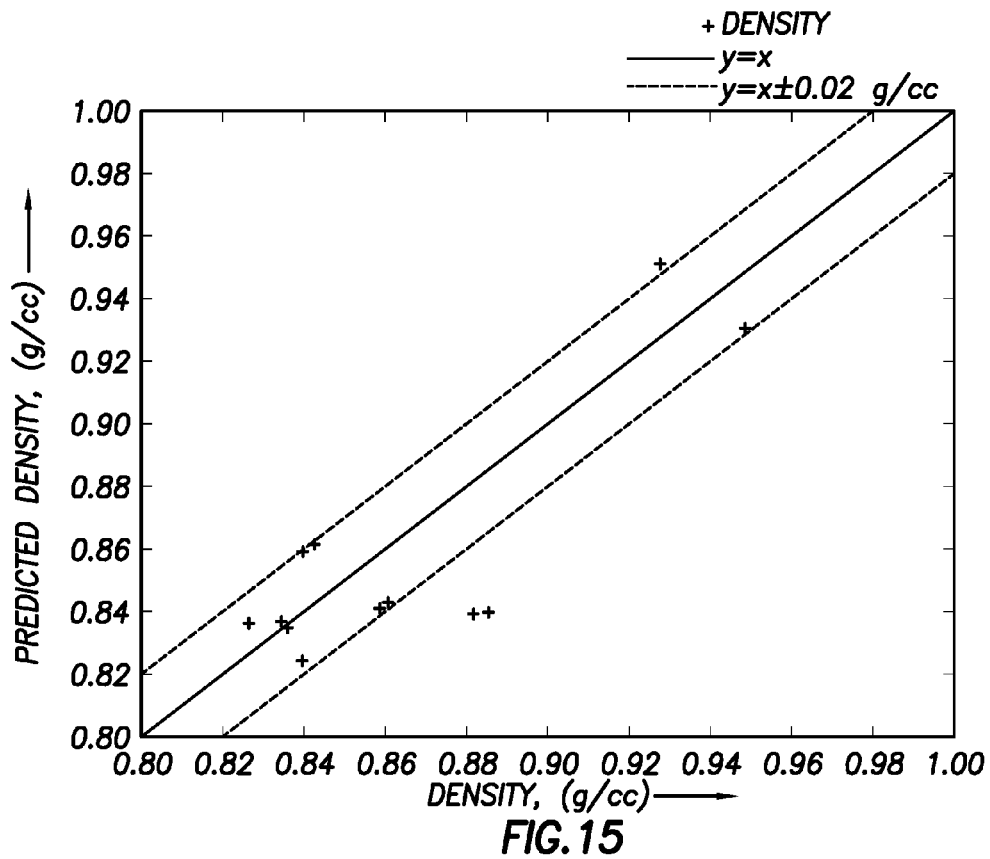
FIG. 15 shows a graph of comparison of mass densities predicted from NIR absorbance measurements with those measured in the laboratory for a data base of 14 live crude oils.
Figure 13A:
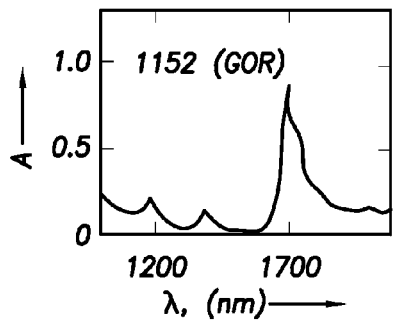
FIG. 13 shows measured NIR absorbances (optical densities) versus wavelength for a data base of 14 live oils.
Figure 13E:
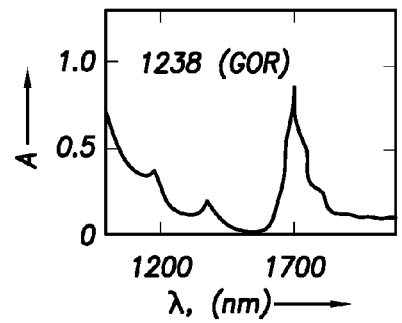
Figure 13B:
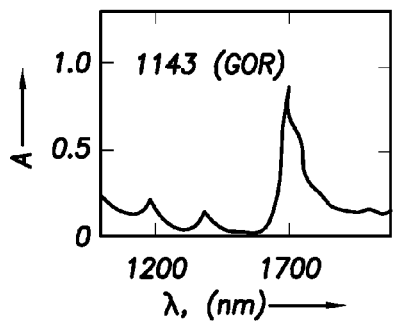
Figure 13F:
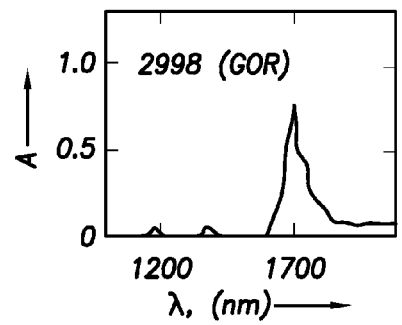
Figure 13C:
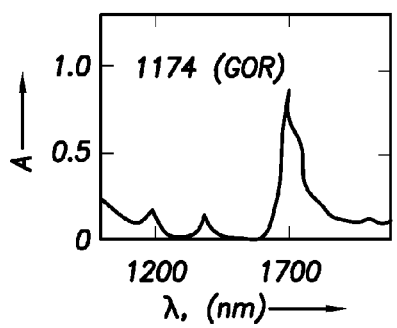
Figure 13G:
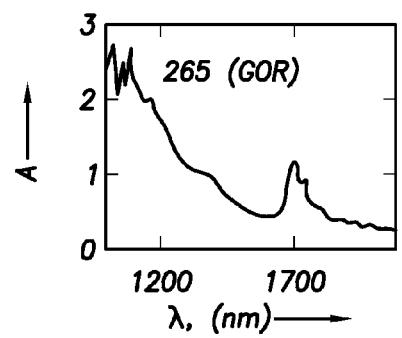
Figure 13D:
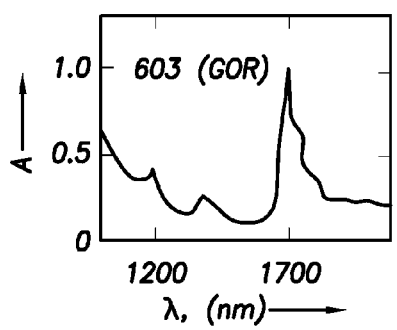
Figure 13H:
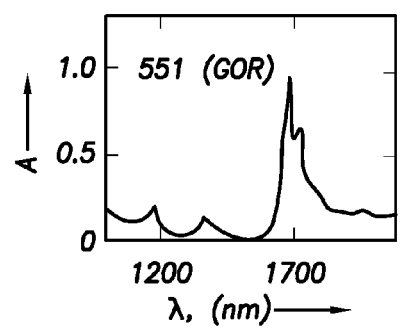
Figure 13I:
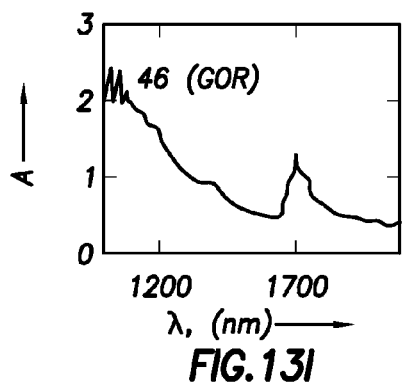
Figure 13M:
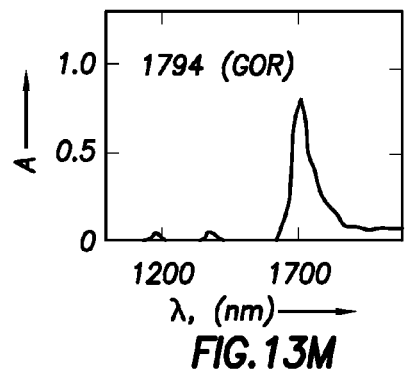
Figure 13J:
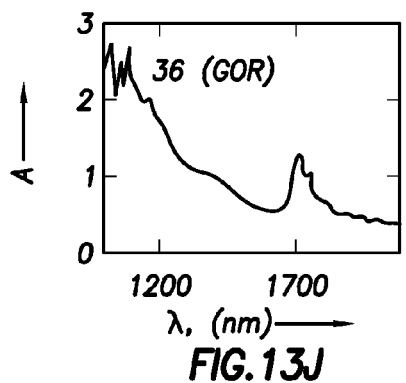
Figure 13N:
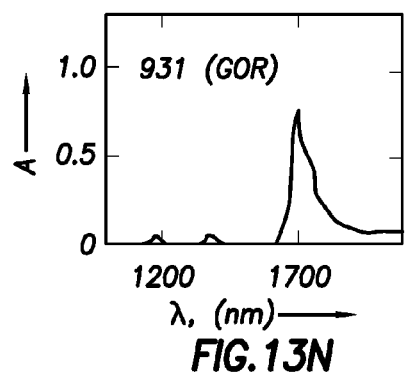
Figure 13K:
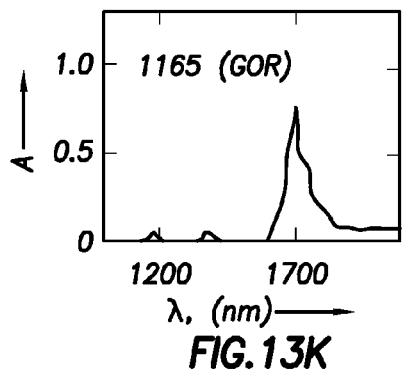
Figure 13L:
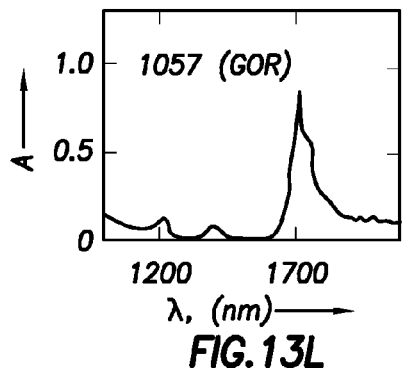
Figure 14A:
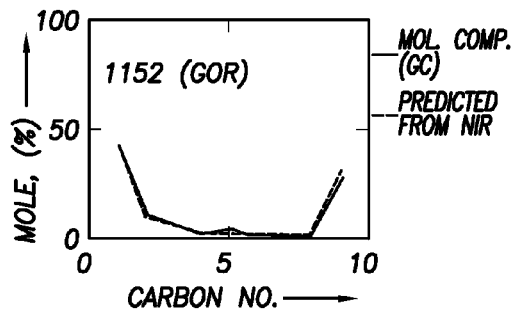
FIG. 14 shows a comparison of compositions predicted from measured NIR absorbances with those measured in the laboratory using gas chromatography for a data base of 14 live crude oils.
Figure 14E:
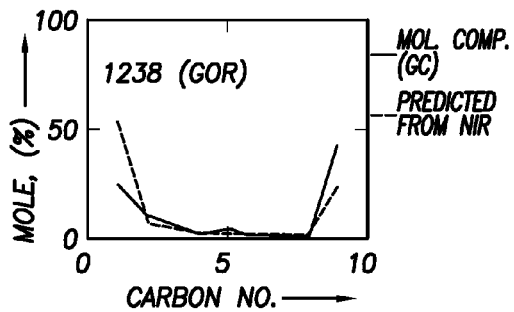
Figure 14B:
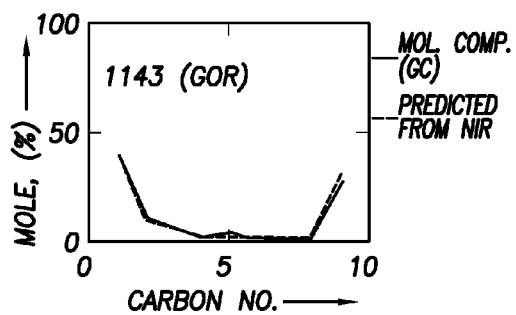
Figure 14F:
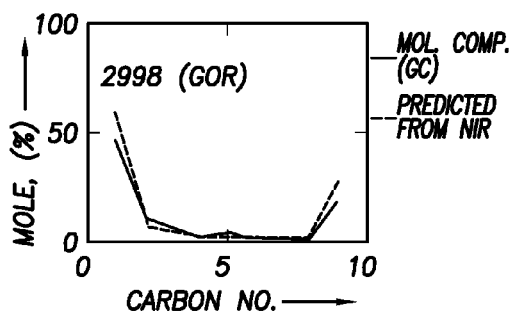
Figure 14C:
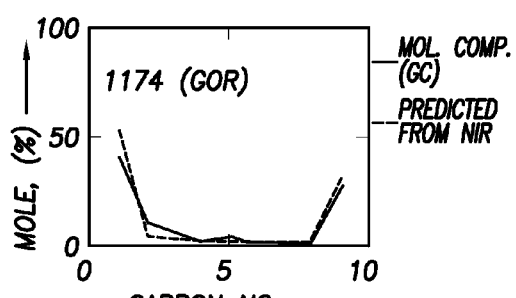
Figure 14G:
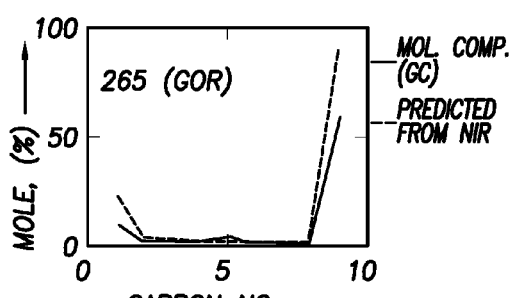
Figure 14D:
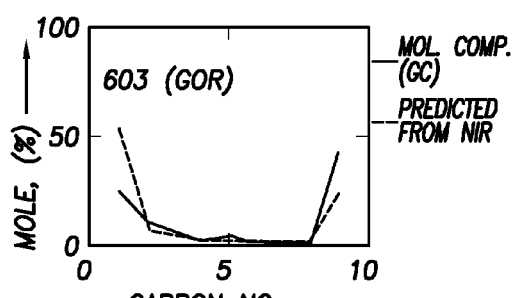
Figure 14H:
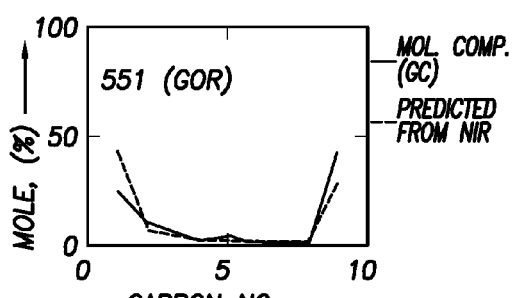
Figure 14I:
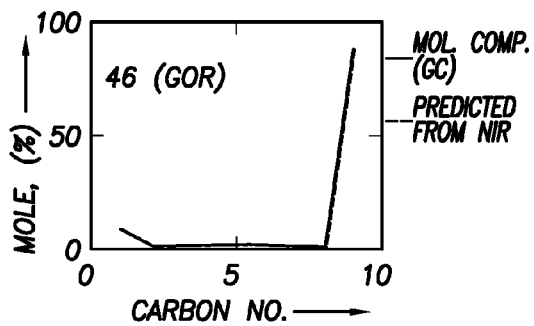
Figure 14M:
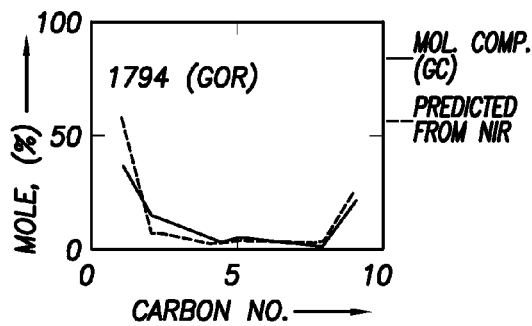
Figure 14J:
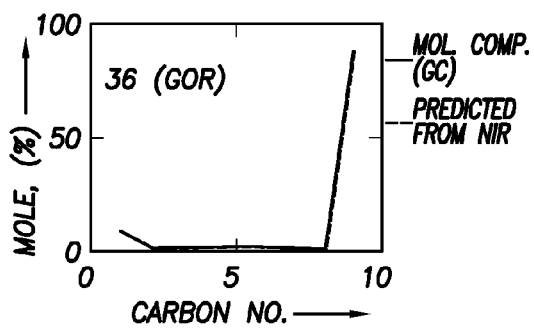
Figure 14N:
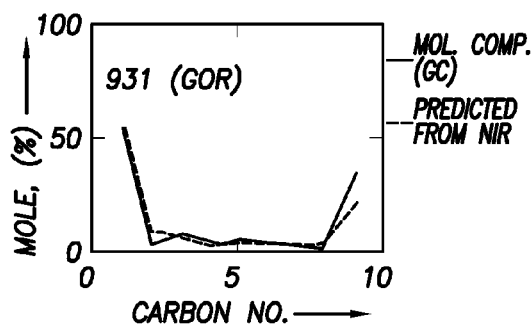
Figure 14K:
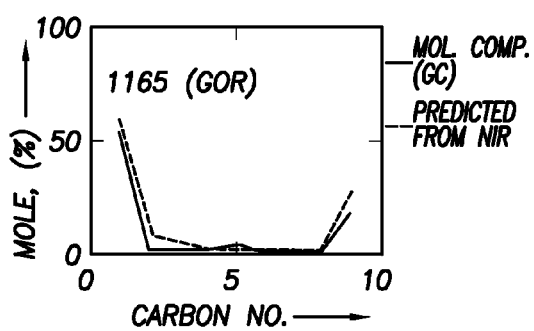
Figure 14L:
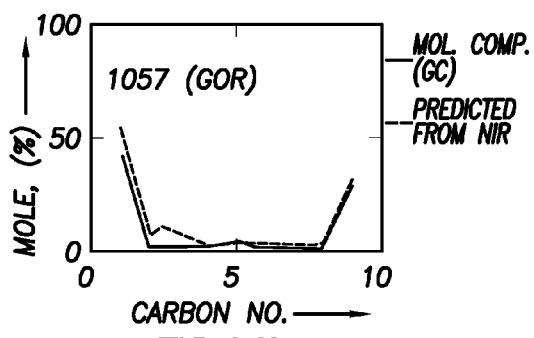

The mapping function used to predict composition from NIR measurements is obtained from Eq. 19 by replacing the scalar viscosity output by a composition output vector. A vector containing the measured optical density at each wavelength replaces the amplitudes in the T2 distribution. The scalar weight in Eq. 19 is replaced by a weight vector with dimension equal to the number of carbon numbers in the GC compositions. The compositions predicted from the NIR absorption measurements are shown in FIG. 14 along with those measured by GC. These results were obtained using the NWRE approximation for the weights. Nearest neighbor distances were used for the RBF widths. These results show that RBF interpolation provides a viable method for predicting composition from NIR absorption measurements. The oil densities predicted from the NIR measurements are shown in FIG. 15. Note that they agree with the measured values to within ±0.02 g/cc.

The invention claimed is:

1. A method for determining a characteristic of earth formations from measurements taken on said formations, comprising the steps of:

producing a data base that includes a multiplicity of data points, each data point representing a stored formation characteristic output related to a stored input measurement;

deriving, from said data base, a mapping function;

deriving an input formation measurement value; and determining an output formation characteristic value, from said data base, said mapping function, and said input formation measurement value.

2. The method as defined by claim 1, wherein said mapping function comprises a weighted sum of non-linear functions.

3. A method for determining a characteristic of earth formations from measurements taken on said formations, comprising the steps of:

producing a data base that includes a multiplicity of data points, each data point representing a stored formation characteristic output related to a stored input measurement;

deriving, from said data base, a radial basis function mapping function;

deriving an input formation measurement value; and determining, using radial basis function interpolation, an output formation characteristic value, from said data base, said mapping function, and said input formation measurement value.

4. The method as defined by claim 3, further comprising using said data base to determine parameters of said radial basis function mapping function.

5. The method as defined by claim 3, wherein said radial basis function mapping function includes weighting coefficients and non-linear radial basis functions, and further comprising the step of using said data base to determine said weighting coefficients.

6. The method as defined by claim 3, wherein said radial basis function mapping function includes weighting coefficients and non-linear radial basis functions, and further comprising the step of using said data base to determine the parameters of said non-linear radial basis functions.

7. The method as defined by claim 3, wherein said radial basis function mapping function includes weighting coefficients and Gaussian radial basis functions, and further comprising the steps of using said data base to determine said weighting coefficients and the widths of said Gaussian radial basis functions.

8. The method as defined by claim 3, wherein said earth formations are formations surrounding an earth borehole, and wherein said measurements are taken with a logging device in said borehole.

9. The method as defined by claim 8, further comprising repeating said steps of deriving an input formation measurement value for different depth levels in the borehole and of determining said output formation characteristic value for said different depth levels, and further comprising producing a log of said output formation characteristic value as a function of depth level.

10. The method as defined by claim 8, wherein said formation measurement value comprises an electrical logging measurement value.

11. The method as defined by claim 8, wherein said formation measurement value comprises a nuclear logging measurement value.

12. The method as defined by claim 8, wherein said formation measurement value comprises a sonic logging measurement value.

13. The method as defined by claim 8, wherein said formation measurement value comprises a fluid sampling logging measurement value.

14. The method as defined by claim 8, wherein said formation measurement value comprises an NMR logging measurement value.

15. The method as defined by claim 3, wherein said formation measurement value comprises measurements from instruments on the earth's surface or seafloor.

16. A method for determining a characteristic of earth formations from measurements taken on said formations, comprising the steps of:

producing a data base that includes a multiplicity of data points, each data point representing a stored m-dimensional formation characteristic output vector related to a stored n-dimensional input measurement vector;

deriving, from said data base, a radial basis function mapping function;

deriving an n-dimensional input formation measurement value vector; and determining, using radial basis function interpolation, an output m-dimensional formation characteristic value vector, from said data base, said mapping function, and said input formation measurement value.

17. The method as defined by claim 16, further comprising using said data base to determine parameters of said radial basis function mapping function.

18. The method as defined by claim 16, wherein said radial basis function mapping function includes weighting coefficients and non-linear radial basis functions, and further comprising the step of using said data base to determine said weighting coefficients.

19. The method as defined by claim 16, wherein said radial basis function mapping function includes weighting coefficients and non-linear radial basis functions, and further comprising the step of using said data base to determine parameters of said non-linear radial basis functions.

20. The method as defined by claim 16, wherein said radial basis function mapping function includes weighting coefficients and Gaussian radial basis functions, and further comprising the steps of using said data base to determine said weighting coefficients and the widths of said Gaussian radial basis functions.

21. The method as defined by claim 16, wherein said step of deriving an n-dimensional input formation measurement value vector comprises obtaining said measurement value vector from measurements with a logging device in the borehole.

22. The method as defined by claim 21, further comprising repeating said steps of deriving an input formation measurement value vector for different depth levels in the borehole and of determining said output formation characteristic value vector for said different depth levels, and further comprising producing a log of said output formation characteristic value vector as a function of depth level.

23. The method as defined by claim 21, wherein said formation measurement value vector comprises an electrical logging measurement value.

24. The method as defined by claim 21, wherein said formation measurement value vector comprises a nuclear logging measurement value.

25. The method as defined by claim 21, wherein said formation measurement value vector comprises a sonic logging measurement value.

26. The method as defined by claim 21, wherein said formation measurement value vector comprises a fluid sampling logging measurement value.

27. The method as defined by claim 21, wherein said formation measurement vector value comprises an NMR logging measurement value.

28. The method as defined by claim 16, wherein said formation measurement value vector comprises measurements from instruments on the earth's surface or seafloor.

* * * * *